(12) United States Patent
Jung et al.

(10) Patent No.: US 11,500,376 B2
(45) Date of Patent: Nov. 15, 2022

(54) APPARATUS AND METHOD FOR PROVIDING GAME SERVICE FOR MANAGING VEHICLE

(71) Applicant: LG ELECTRONICS INC., Seoul (KR)

(72) Inventors: Jun Young Jung, Seoul (KR); Hyun Kyu Kim, Seoul (KR); Ki Bong Song, Seoul (KR); Chul Hee Lee, Bucheon-si (KR); Sang Kyeong Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 563 days.

(21) Appl. No.: 16/584,632

(22) Filed: Sep. 26, 2019

(65) Prior Publication Data
US 2020/0042000 A1 Feb. 6, 2020

(30) Foreign Application Priority Data

Aug. 30, 2019 (KR) .................. 10-2019-0107435

(51) Int. Cl.
*G05D 1/00* (2006.01)
*A63F 13/23* (2014.01)
(Continued)

(52) U.S. Cl.
CPC .......... *G05D 1/0061* (2013.01); *A63F 13/23* (2014.09); *A63F 13/35* (2014.09); *A63F 13/65* (2014.09);
(Continued)

(58) Field of Classification Search
CPC .......... A63F 13/23; A63F 13/35; A63F 13/65; A63F 13/803; A63F 13/95; G06N 3/04;
(Continued)

(56) References Cited

U.S. PATENT DOCUMENTS 9,101,824 B2\* 8/2015 Cash ..................... G06F 3/017
10,226,702 B2\* 3/2019 Hoory ..................... A63F 13/65
(Continued)

FOREIGN PATENT DOCUMENTS

KR 101063680 9/2011

*Primary Examiner* — Reginald A Renwick
(74) *Attorney, Agent, or Firm* — Lee, Hong, Degerman, Kang & Waimey PC

(57) ABSTRACT

An embodiment of the present disclosure provides a vehicle management game service providing device installed in a vehicle. The vehicle management game service providing device includes a receiver, a controller, which obtains vehicle information, and determines whether a user's intervention is required with regard to a vehicle-related task on the basis of the obtained vehicle information, a user interface, which receives a user input signal, and provides a screen according to execution of the user game, and an operator, which operates the vehicle according to a vehicle control signal. At least one among an autonomous vehicle, a user terminal, and a server according to embodiments of the present disclosure may be associated or integrated with an artificial intelligence module, a drone (unmanned aerial vehicle (UAV)), a robot, an augmented reality (AR) device, a virtual reality (VR) device, a 5G service related device, and the like.

20 Claims, 16 Drawing Sheets

(51) Int. Cl.

| | | |
|---|---|---|
| *A63F 13/95* | (2014.01) | |
| *A63F 13/803* | (2014.01) | |
| *A63F 13/65* | (2014.01) | |
| *G07C 5/00* | (2006.01) | |
| *G07C 5/08* | (2006.01) | |
| *G05B 13/02* | (2006.01) | |
| *G05B 13/04* | (2006.01) | |
| *G06N 3/04* | (2006.01) | |
| *H04W 4/40* | (2018.01) | |
| *A63F 13/35* | (2014.01) | |
| *G06F 3/0481* | (2022.01) | |
| *H04W 4/80* | (2018.01) | |
| *H04W 84/04* | (2009.01) | |
| *H04W 72/14* | (2009.01) | |
| *G06F 3/0484* | (2022.01) | |

(52) U.S. Cl.
CPC ............ *A63F 13/803* (2014.09); *A63F 13/95* (2014.09); *G05B 13/027* (2013.01); *G05B 13/048* (2013.01); *G06N 3/04* (2013.01); *G07C 5/008* (2013.01); *G07C 5/0816* (2013.01); *H04W 4/40* (2018.02); *A63F 2300/1025* (2013.01); *A63F 2300/206* (2013.01); *A63F 2300/53* (2013.01); *A63F 2300/69* (2013.01); *A63F 2300/8017* (2013.01); *G06F 3/0481* (2013.01); *G06F 3/0484* (2013.01); *H04W 4/80* (2018.02); *H04W 72/14* (2013.01); *H04W 84/042* (2013.01)

(58) Field of Classification Search
CPC .... G07C 5/008; G07C 5/0816; G05B 13/027; G05B 13/048; H04W 4/40
See application file for complete search history.

(56) References Cited

U.S. PATENT DOCUMENTS

| | | | | |
|---|---|---|---|---|
| 10,453,260 | B2 * | 10/2019 | Aniz | ............... G06T 7/70 |
| 10,850,744 | B2 * | 12/2020 | Alaniz | ............. G02B 27/017 |
| 2006/0009289 | A1 * | 1/2006 | McCarten | ............ A63F 13/352 |
| | | | | 463/42 |
| 2007/0149284 | A1 * | 6/2007 | Plavetich | ................ A63F 13/00 |
| | | | | 463/37 |
| 2014/0128144 | A1 * | 5/2014 | Bavitz | .................... A63F 13/65 |
| | | | | 463/23 |
| 2022/0187822 | A1 * | 6/2022 | Cella | ................. H04B 17/309 |

* cited by examiner

APPARATUS AND METHOD FOR PROVIDING GAME SERVICE FOR MANAGING VEHICLE

CROSS-REFERENCE TO RELATED APPLICATION

Pursuant to 35 U.S.C. § 119(a), this application claims the benefit of earlier filing date and right of priority to Korean Patent Application No. 10-2019-0107435, filed on Aug. 30, 2019, the contents of which are hereby incorporated by reference herein in its entirety.

BACKGROUND

1. Technical Field

The present disclosure relates to a vehicle management game service providing device and method for providing a game for controlling a vehicle, particularly, a sub game capable of controlling an autonomous vehicle by a game manipulation input while executing a main game.

2. Description of Related Art

With an increase of users' requests about vehicles, various systems for improving driver's safety and convenience are being developed. In addition, researches are being actively carried out to develop autonomous vehicles.

Since it is possible to drive an autonomous vehicle without an additional manipulation by a driver, an occupant of the autonomous vehicle may perform other tasks, such as game playing or the like, using a user terminal or a device installed in the vehicle when the vehicle is driven.

However, when the occupant performs other tasks without performing a driving manipulation during the automatic driving of the autonomous vehicle, the occupant may miss an important situation for which an occupant's decision is required with regard to driving of the autonomous vehicle.

Korean Patent Registration No. 1063680 discloses one of conventional methods for controlling a vehicle by using a game. According to this method, items that affect fuel efficiency are collected to implement a game for inducing a driver to perform fuel-efficient driving.

However, according to the conventional fuel-efficiency game disclosed in the above document, the fuel-efficiency game can be executed only by being selected by a driver regardless of the state of a vehicle, and merely induces a driving manner of the driver according to a result of the fuel-efficiency, and thus a manipulation performed during the fuel-efficiency game cannot be directly reflected in controlling a vehicle.

Therefore, an autonomous vehicle may not be additionally controlled even if an important situation occurs, for which the vehicle is required to be managed, when the occupant is performing a task other than a driving task, such as a game, during driving of the vehicle.

Therefore, it is necessary to develop a technology for recognizing an intention of a user when a decision is required to be made with regard to driving of an autonomous vehicle and reflecting the intention in controlling the autonomous vehicle even while the user is playing a game in the autonomous vehicle.

SUMMARY OF THE INVENTION

An aspect of the present disclosure is to provide a vehicle management game service providing device and method for allowing an occupant of an autonomous vehicle to recognize an important situation change of a travel environment and guide a travel direction of the vehicle through game manipulation during execution of a game.

Another aspect of the present disclosure is to provide a vehicle management game service providing device and method for accumulating data pertaining to a scheme in which an occupant copes with an important situation change through an intention recognition game during autonomous driving of a vehicle, and controlling the autonomous vehicle by using the accumulated data.

Aspects of the present disclosure are not limited to the above-mentioned aspects, and other technical aspects not mentioned above will be clearly understood by those skilled in the art from the following description.

To resolve the above problems, a vehicle management game service providing device according to an embodiment of the present disclosure may execute an intention recognition game that is playable within a game being executed, and may control a vehicle according to a signal input through the intention recognition game when a situation occurs, for which a user's intervention is required with regard to a vehicle-related task during execution of a user game.

In detail, an embodiment of the present disclosure may provide a vehicle management game service providing device installed in a vehicle, the vehicle management game service providing device including a receiver, which communicates with a game providing server for providing information for a user game in response to a user game execution request, a controller, which obtains vehicle information, and determines whether a user's intervention is required with regard to a vehicle-related task on the basis of the obtained vehicle information, a user interface, which receives a user input signal, and provides a screen according to execution of the user game, and an operator, which operates the vehicle according to a vehicle control signal, wherein the controller executes an intention recognition game when the user's intervention is required during the execution of the user game, and generates the vehicle control signal on the basis of information generated according to execution of the intention recognition game in which the user input signal is reflected, and the intention recognition game is a game which determines a user's intention about the vehicle-related task.

In an embodiment of the present disclosure, the intention recognition game may be a game which is executed in an independent area, which is switched from and independent of a user game execution area, within the user game execution area.

In an embodiment of the present disclosure, the vehicle management game service providing device may further include a storage, wherein the controller may store, in the storage, the user's intention determined on the basis of the user input signal input during the execution of the intention recognition game in association with the vehicle information achieved when the user input signal is input, and may generate, when the obtained vehicle information matches the vehicle information stored in the storage, the vehicle control signal according to the user's intention matched to the stored vehicle information without executing the intention recognition game.

In an embodiment of the present disclosure, the controller may generate initial learning data on the basis of a plurality of pieces of the vehicle information stored in the storage and user's intentions matched to the vehicle information, may check garbage data with regard to the generated initial learning data via the user interface, may refine, on the basis of a result of the garbage data checking, the initial learning data to achieve final learning data in which the user's intentions are reflected without an error, may generate a prediction model by performing machine learning on the basis of the refined final learning data, and may generate the vehicle control signal according to the user's intention predicted by the prediction model without executing the intention recognition game since the prediction model is generated.

In an embodiment of the present disclosure, based on determination that the user's intervention is required, the controller may receive the intention recognition game from the game providing server via the receiver.

In an embodiment of the present disclosure, the vehicle information may include a fuel state and a vehicle defect state, and the vehicle-related task may include a change of a waypoint of the vehicle.

In an embodiment of the present disclosure, the vehicle information may further include a driver preference and a scheduled travel route.

In an embodiment of the present disclosure, the receiver may receive the vehicle information on the basis of a downlink grant of a 5G network connected for the vehicle to operate in an autonomous mode.

An embodiment of the present disclosure may provide a vehicle management game service providing device communicating with a vehicle that operates according to a vehicle control signal, the vehicle management game service providing device including a receiver, which communicates with a game providing server for providing information for a user game in response to a user game execution request, a controller, which obtains vehicle information, and determines whether a user's intervention is required with regard to a vehicle-related task on the basis of the obtained vehicle information, and a user interface, which receives a user input signal, and provides a screen according to execution of the user game, wherein the controller executes an intention recognition game when the user's intervention is required during the execution of the user game, and generates the vehicle control signal on the basis of information generated according to execution of the intention recognition game in which the user input signal is reflected, and the intention recognition game is a game which determines a user's intention about the vehicle-related task.

In an embodiment of the present disclosure, the intention recognition game may be a game which is executed in an independent area, which is switched from and independent of a user game execution area, within the user game execution area.

In an embodiment of the present disclosure, the vehicle management game service providing device may further include a storage, wherein the controller may store, in the storage, the user's intention determined on the basis of the user input signal input during the execution of the intention recognition game in association with the vehicle information achieved when the user input signal is input, and may generate, when the obtained vehicle information matches the vehicle information stored in the storage, the vehicle control signal according to the user's intention matched to the stored vehicle information without executing the intention recognition game.

In an embodiment of the present disclosure, the controller may generate initial learning data on the basis of a plurality of pieces of the vehicle information stored in the storage and user's intentions matched to the vehicle information, may check garbage data with regard to the generated initial learning data via the user interface, may refine, on the basis of a result of the garbage data checking, the initial learning data to achieve final learning data in which the user's intentions are reflected without an error, may generate a prediction model by performing machine learning on the basis of the refined final learning data, and may generate the vehicle control signal according to the user's intention predicted by the prediction model without executing the intention recognition game since the prediction model is generated.

In an embodiment of the present disclosure, based on determination that the user's intervention is required, the controller may receive the intention recognition game from the game providing server via the receiver.

In an embodiment of the present disclosure, the vehicle information may include a fuel state and a vehicle defect state, and the vehicle-related task may include a change of a waypoint of the vehicle.

In an embodiment of the present disclosure, the vehicle information may further include a driver preference and a scheduled travel route.

An embodiment of the present disclosure may provide a vehicle management game service providing method including communicating with a game providing server for providing information for a user game in response to a user game execution request, obtaining vehicle information and determining whether a user's intervention is required with regard to a vehicle-related task on the basis of the obtained vehicle information, receiving a user input signal and providing a screen according to execution of the user game, executing an intention recognition game when the user's intervention is required during the execution of the user game, and generating a vehicle control signal on the basis of information generated according to execution of the intention recognition game in which the user input signal is reflected, and operating a vehicle according to the vehicle control signal, wherein the intention recognition game is a game which determines a user's intention about the vehicle-related task.

In an embodiment of the present disclosure, the intention recognition game may be a game which is executed in an independent area, which is switched from and independent of a user game execution area, within the user game execution area.

In an embodiment of the present disclosure, the vehicle management game service providing method may further include storing the user's intention determined on the basis of the user input signal input during the execution of the intention recognition game in association with the vehicle information achieved when the user input signal is input, and generating, when the obtained vehicle information matches the stored vehicle information, the vehicle control signal according to the user's intention matched to the stored vehicle information without executing the intention recognition game.

In an embodiment of the present disclosure, the vehicle management game service providing method may include generating initial learning data on the basis of a plurality of pieces of the vehicle information and user's intentions matched to the vehicle information, checking garbage data with regard to the generated initial learning data, refining, on the basis of a result of the garbage data checking, the initial learning data to achieve final learning data in which the user's intentions are reflected without an error, generating a prediction model by performing machine learning on the basis of the refined final learning data, and generating the vehicle control signal according to the user's intention predicted by the prediction model without executing the intention recognition game since the prediction model is generated.

In an embodiment of the present disclosure, the vehicle management game service providing method may further include receiving the intention recognition game from the game providing server when it is determined that the user's intervention is required.

An embodiment of the present disclosure may provide a computer-readable recording medium in which a vehicle management game service program is recorded, the vehicle management game service program causing a computer to perform communicating with a game providing server for providing information for a user game in response to a user game execution request, obtaining vehicle information, and determining whether a user's intervention is required with regard to a vehicle-related task on the basis of the obtained vehicle information, receiving a user input signal, and providing a screen according to execution of the user game, a means for operating the vehicle according to a vehicle control signal, and executing an intention recognition game when the user's intervention is required during the execution of the user game, and generating the vehicle control signal on the basis of information generated according to execution of the intention recognition game in which the user input signal is reflected, wherein the intention recognition game is a game which determines a user's intention about the vehicle-related task.

Details about other embodiments are included in the detailed description and the drawings.

Embodiments of the present disclosure are not limited to the embodiments described above, and other embodiments not mentioned above will be clearly understood from the description below.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
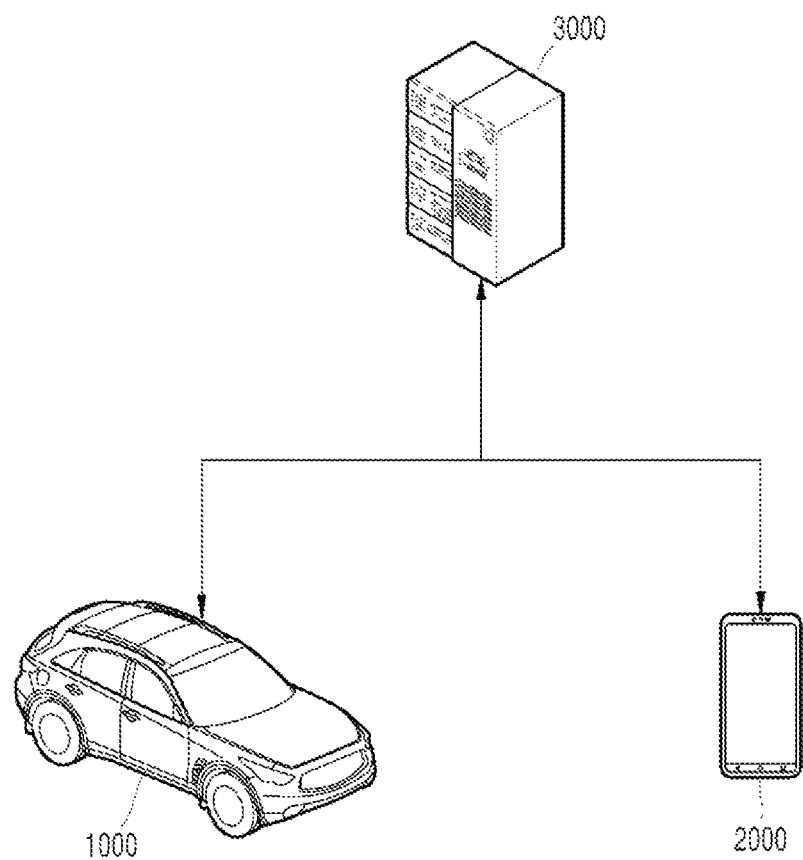
FIG. 1 is a diagram illustrating a system in which a vehicle management game service providing device according to an embodiment of the present disclosure is applied.

Hereinafter, exemplary embodiments disclosed the present invention will be described in detail with reference to the accompanying drawings, and the same or similar components are denoted by the same reference numerals regardless of reference numerals, and repeated description thereof will be omitted. In the following description, the terms "module" and "unit" for referring to elements are assigned and used exchangeably in consideration of convenience of explanation, and thus, the terms per se do not necessarily have different meanings or functions. In the following description of the embodiments disclosed herein, the detailed description of related known technology will be omitted when it may obscure the subject matter of the embodiments according to the present disclosure. The accompanying drawings are merely used to help easily understand embodiments of the present disclosure, and it should be understood that the technical idea of the present disclosure is not limited by the accompanying drawings, and these embodiments include all changes, equivalents or alternatives within the idea and the technical scope of the present disclosure.

Although the terms first, second, third, and the like, may be used herein to describe various elements, components, regions, layers, and/or sections, these elements, components, regions, layers, and/or sections should not be limited by these terms. These terms are generally only used to distinguish one element from another.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present.

It must be noted that as used herein and in the appended claims, the singular forms "a," "an," and "the" include the plural references unless the context clearly dictates otherwise.

It should be understood that the terms "comprises," "comprising," "includes," "including," "containing," "has," "having" or any other variation thereof specify the presence of stated features, integers, steps, operations, elements, and/or components, but do not preclude the presence or addition of one or more other features, integers, steps, operations, elements, and/or components.

A vehicle described in this specification refers to a car, a motorcylce, and the like. Hereinafter, the vehicle will be exemplified as an automobile.

The vehicle described in the present disclosure may include, but is not limited to, a vehicle having an internal combustion engine as a power source, a hybrid vehicle having an engine and an electric motor as a power source, and an electric vehicle having an electric motor as a power source.

FIG. 1 is a diagram illustrating a system in which a vehicle management game service providing device according to an embodiment of the present disclosure is applied.

Referring to FIG. 1, a vehicle 1000 or a user terminal 2000 may be connected to a server 3000 for providing a game, so as to allow an occupant to execute a user game.

When an emergency situation for which management of the vehicle 1000 is required occurs during the execution of the user game, the vehicle 1000 or the user terminal 2000 communicating with the vehicle 1000 may receive, from the server 3000, an intention recognition game executable in an independent area in the user game.

The server 3000 may provide information for the user game to the vehicle 1000 or the user terminal 2000 in response to a user game execution request of the vehicle 1000 or the user terminal 2000.

Figure 2:
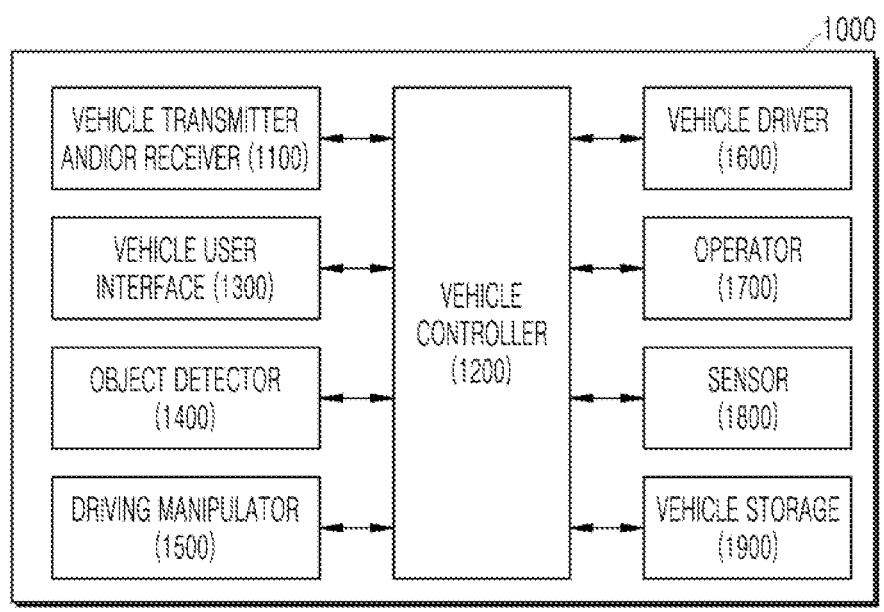
FIG. 2 is a block diagram illustrating a vehicle management game service providing device installed in a vehicle side according to an embodiment of the present disclosure.

FIG. 2 is a block diagram illustrating a vehicle management game service providing device installed in a vehicle side according to an embodiment of the present disclosure.

Referring to FIG. 2, the vehicle management game service providing device may include a vehicle transmitter and/or receiver 1100, a vehicle controller 1200, a vehicle user interface 1300, an object detector 1400, a driving manipulator 1500, a vehicle driver 1600, an operator 1700, a sensor 1800, and a vehicle storage 1900.

According to an embodiment, the vehicle 1000 in which the vehicle management game service providing device is applied may include other elements in addition to the elements illustrated in FIG. 2 and described below, or may not include portion of the elements illustrated in FIG. 2 and described below.

The vehicle 1000 may be switched from an autonomous mode to a manual mode or vice versa according to a driving situation. Here, the driving situation may be determined on the basis of at least one among information received by the vehicle transmitter and/or receiver 1100, external object information detected by the object detector 1400, and navigation information obtained by a navigation module.

The vehicle 1000 may be switched from the autonomous mode to the manual mode, or from the manual mode to the autonomous mode, according to a user input received through the user interface 1300.

When the vehicle 1000 is operated in the autonomous driving mode, the vehicle 1000 may be operated under the control of the operator 1700 that controls driving, parking, and unparking. When the vehicle 1000 is operated in the manual mode, the vehicle 1000 may be operated by an input of the driver's mechanical driving operation.

The vehicle transmitter and/or receiver 1100 may be a module for performing communication with an external device. Here, the external device may be a user terminal 2000 or a server 3000.

The vehicle transmitter and/or receiver 1100 may communicate with the game providing server 3000 which provides information for a user game.

The vehicle transmitter and/or receiver 1100 may include at least one among a transmission antenna, a reception antenna, a radio frequency (RF) circuit capable of implementing various communication protocols, and an RF element in order to perform communication.

The vehicle transmitter and/or receiver 1100 may perform short range communication, GPS signal reception, V2X communication, optical communication, broadcast transmission/reception, and intelligent transport systems (ITS) communication functions.

The vehicle transmitter and/or receiver 1100 may further support other functions than the functions described, or may not support some of the functions described, depending on the embodiment.

The vehicle transmitter and/or receiver 1100 may support short-range communication by using at least one among Bluetooth™, Radio Frequency Identification (RFID), Infrared Data Association (IrDA), Ultra WideBand (UWB), ZigBee, Near Field Communication (NFC), Wireless-Fidelity (Wi-Fi), Wi-Fi Direct, and Wireless Universal Serial Bus (Wireless USB) technologies.

The vehicle transmitter and/or receiver 1100 may form short-range wireless communication networks so as to perform short-range communication between the vehicle 1000 and at least one external device.

The vehicle transmitter and/or receiver 1100 may include a Global Positioning System (GPS) module or a Differential Global Positioning System (DGPS) module for obtaining location information of the vehicle 1000.

The vehicle transmitter and/or receiver 1100 may include a module for supporting wireless communication between the vehicle 1000 and a server 3000 (V2I: vehicle to infrastructure), communication with another vehicle (V2V: vehicle to vehicle) or communication with a pedestrian (V2P: vehicle to pedestrian). That is, the vehicle transmitter and/or receiver 1100 may include a V2X communication module. The V2X communication module may include an RF circuit capable of implementing V2I, V2V, and V2P communication protocols.

The vehicle transmitter and/or receiver 1100 may receive a danger information broadcast signal transmitted by another vehicle through the V2X communication module, and may transmit a danger information inquiry signal and receive a danger information response signal in response thereto.

The vehicle transmitter and/or receiver 1100 may include an optical communication module for performing communication with an external device via light. The optical communication module may include a light transmitting module for converting an electrical signal into an optical signal and transmitting the optical signal to the outside, and a light receiving module for converting the received optical signal into an electrical signal.

The light transmitting module may be formed to be integrated with the lamp included in the vehicle 1000.

The vehicle transmitter and/or receiver 1100 may include a broadcast communication module for receiving broadcast signals from an external broadcast management server, or transmitting broadcast signals to the broadcast management server through broadcast channels. The broadcast channel may include a satellite channel and a terrestrial channel. Examples of the broadcast signal may include a TV broadcast signal, a radio broadcast signal, and a data broadcast signal.

The vehicle transmitter and/or receiver 1100 may include an ITS communication module that exchanges information, data or signals with a traffic system. The ITS communication module may provide the obtained information and data to the traffic system. The ITS communication module may receive information, data, or signals from the traffic system. For example, the ITS communication module may receive road traffic information from the communication system and provide the road traffic information to the vehicle controller 1200. For example, the ITS communication module may receive control signals from the traffic system and provide the control signals to the vehicle controller 1200 or a processor provided in the vehicle 1000.

Depending on the embodiment, the overall operation of each module of the vehicle transmitter and/or receiver 1100 may be controlled by a separate process provided in the vehicle transmitter and/or receiver 1100. The vehicle transmitter and/or receiver 1100 may include a plurality of processors, or may not include a processor. When a processor is not included in the vehicle transmitter and/or receiver 1100, the vehicle transmitter and/or receiver 1100 may be operated by either a processor of another apparatus in the vehicle 1000 or the vehicle controller 1200.

The vehicle transmitter and/or receiver 1100 may, together with the vehicle user interface 1300, implement a vehicle-use display device. In this case, the vehicle-use display device may be referred to as a telematics device or an audio video navigation (AVN) device.

The vehicle transmitter and/or receiver 1100 may receive vehicle information on the basis of a downlink grant of a 5G network connected to operate in the autonomous mode.

Figure 4:
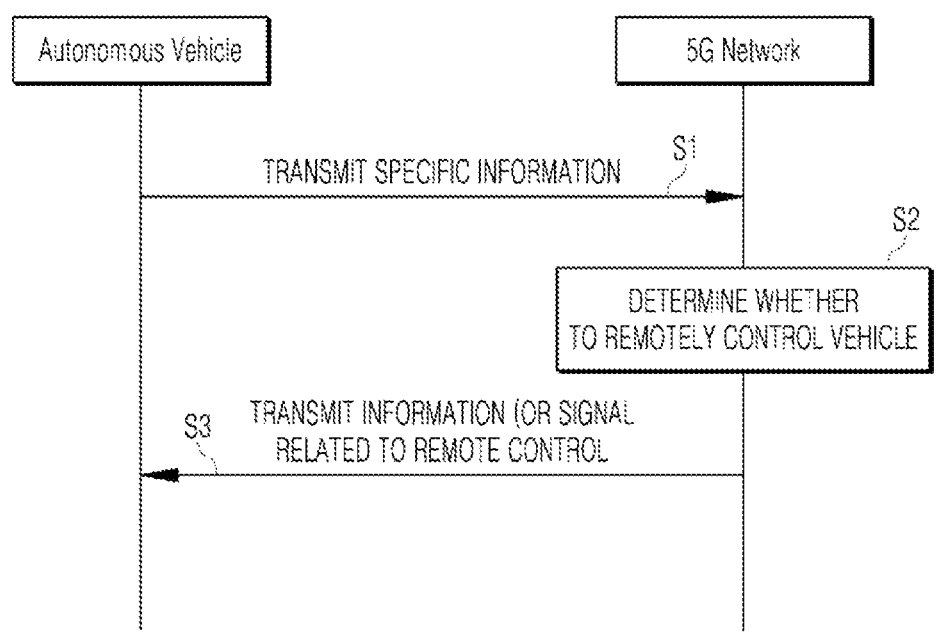
FIG. 4 is a diagram showing an example of the basic operation of an autonomous vehicle and a 5G network in a 5G communication system.
Figure 5:
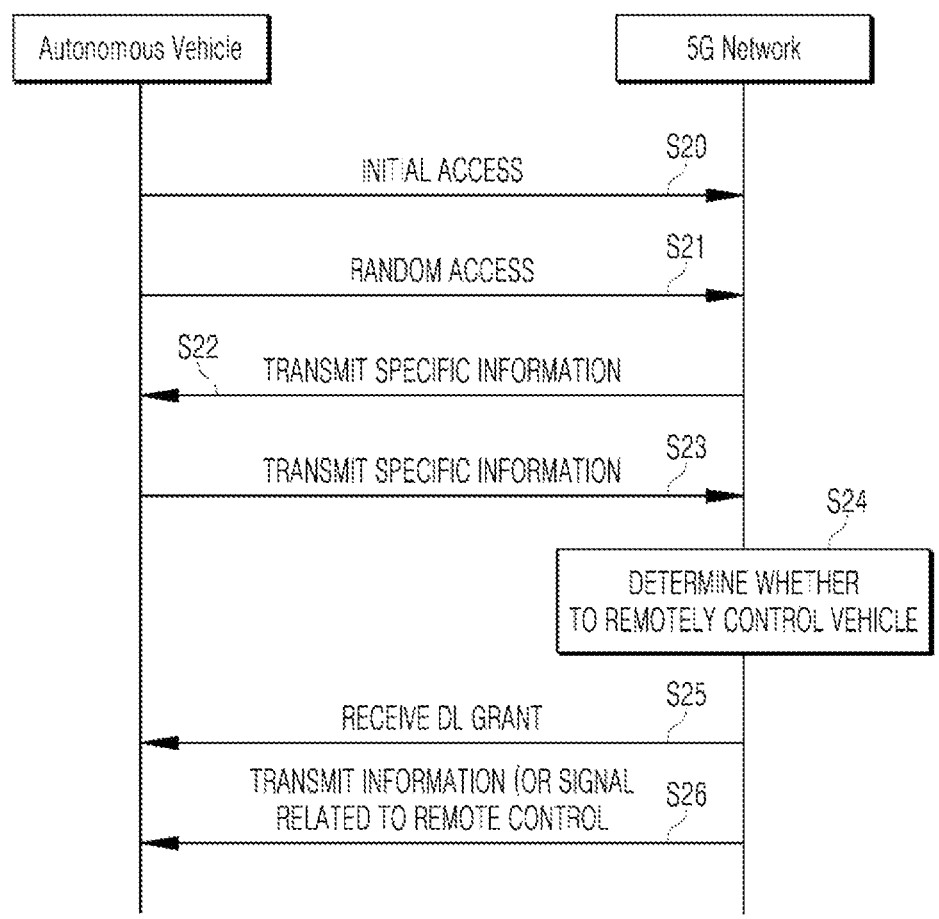
FIG. 5 is a diagram illustrating an example of applied operations of an autonomous vehicle and a 5G network in a 5G communication system.

FIG. 4 is a diagram showing an example of the basic operation of an autonomous vehicle and a 5G network in a 5G communication system.

The vehicle transmitter and/or receiver 1100 may transmit specific information over a 5G network when the vehicle 1000 is operated in the autonomous driving mode.

The specific information may include autonomous driving related information.

The autonomous driving related information may be information directly related to the driving control of the vehicle. For example, the autonomous driving related information may include at least one among object data indicating an object near the vehicle, map data, vehicle status data, vehicle location data, and driving plan data.

The autonomous driving related information may further include service information necessary for autonomous driving. For example, the specific information may include information on a destination inputted through the user terminal 1300 and a safety rating of the vehicle.

In addition, the 5G network may determine whether a vehicle is to be remotely controlled (S2).

The 5G network may include a server or a module for performing remote control related to autonomous driving.

The 5G network may transmit information (or a signal) related to the remote control to an autonomous vehicle (S3).

As described above, information related to the remote control may be a signal directly applied to the autonomous vehicle, and may further include service information necessary for autonomous driving, such as driving information. The autonomous vehicle according to this embodiment may receive service information such as insurance for each interval selected on a driving route and risk interval information, through a server connected to the 5G network to provide services related to the autonomous driving.

An essential process for performing 5G communication between the autonomous vehicle 1000 and the 5G network (for example, an initial access process between the vehicle 1000 and the 5G network) will be briefly described with reference to FIG. 5 to FIG. 9 below.

An example of operations through the autonomous vehicle 1000 performed in the 5G communication system and the 5G network is as follows.

The vehicle 1000 may perform an initial access process with the 5G network (initial access step, S20). In this case, the initial access procedure includes a cell search process for acquiring downlink (DL) synchronization and a process for acquiring system information.

The vehicle 1000 may perform a random access process with the 5G network (random access step, S21). At this time, the random access procedure includes an uplink (UL) synchronization acquisition process or a preamble transmission process for UL data transmission, a random access response reception process, and the like.

The 5G network may transmit an Uplink (UL) grant for scheduling transmission of specific information to the autonomous vehicle 1000 (UL grant receiving step, S22).

The procedure by which the vehicle 1000 receives the UL grant includes a scheduling process in which a time/frequency resource is allocated for transmission of UL data to the 5G network.

The autonomous vehicle 1000 may transmit specific information over the 5G network based on the UL grant (specific information transmission step, S23).

The 5G network may determine whether the vehicle 1000 is to be remotely controlled based on the specific information transmitted from the vehicle 1000 (vehicle remote control determination step, S24).

The autonomous vehicle 1000 may receive the DL grant through a physical DL control channel for receiving a response on pre-transmitted specific information from the 5G network (DL grant receiving step, S25).

The 5G network may transmit information (or a signal) related to the remote control to the autonomous vehicle 1000 based on the DL grant (remote control related information transmission step, S26).

A process in which the initial access process and/or the random access process between the 5G network and the autonomous vehicle 1000 is combined with the DL grant receiving process has been exemplified. However, the present disclosure is not limited thereto.

For example, an initial access procedure and/or a random access procedure may be performed through an initial access step, an UL grant reception step, a specific information transmission step, a remote control decision step of the vehicle, and an information transmission step associated with remote control. In addition, for example, the initial access process and/or the random access process may be performed through the random access step, the UL grant receiving step, the specific information transmission step, the vehicle remote control determination step, and the remote control related information transmission step. The autonomous vehicle 1000 may be controlled by the combination of an AI operation and the DL grant receiving process through the specific information transmission step, the vehicle remote control determination step, the DL grant receiving step, and the remote control related information transmission step.

The operation of the autonomous vehicle 1000 described above is merely exemplary, but the present disclosure is not limited thereto.

For example, the operation of the autonomous vehicle 1000 may be performed by selectively combining the initial access step, the random access step, the UL grant receiving step, or the DL grant receiving step with the specific information transmission step, or the remote control related information transmission step. The operation of the autonomous vehicle 1000 may include the random access step, the UL grant receiving step, the specific information transmission step, and the remote control related information transmission step. The operation of the autonomous vehicle 1000 may include the initial access step, the random access step, the specific information transmission step, and the remote control related information transmission step. The operation of the autonomous vehicle 1000 may include the UL grant receiving step, the specific information transmission step, the DL grant receiving step, and the remote control related information transmission step.

Figure 6:
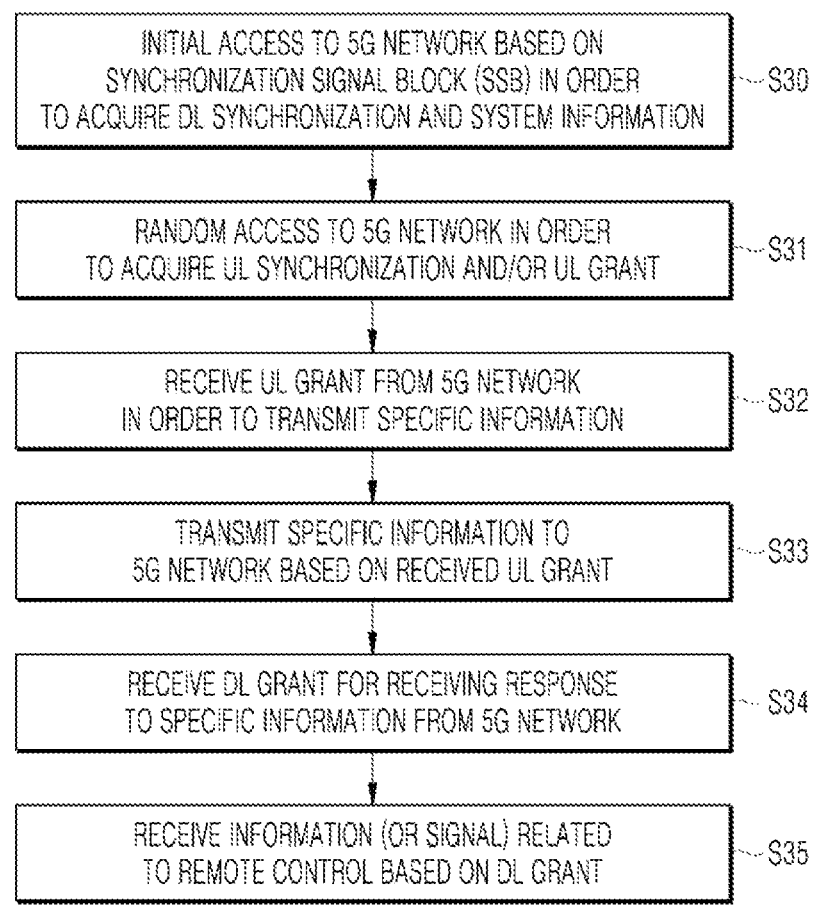
FIGS. 6 to 9 are diagrams illustrating examples of operation of an autonomous vehicle using 5G communication.

As illustrated in FIG. 6, the vehicle 1000 including an autonomous driving module may perform an initial access process with the 5G network based on Synchronization Signal Block (SSB) in order to acquire DL synchronization and system information (initial access step).

The autonomous vehicle 1000 may perform a random access process with the 5G network for UL synchronization acquisition and/or UL transmission (random access step, S31).

The autonomous vehicle 1000 may receive the UL grant from the 5G network for transmitting specific information (UL grant receiving step, S32).

The autonomous vehicle 1000 may transmit the specific information to the 5G network based on the UL grant (specific information transmission step, S33).

The autonomous vehicle 1000 may receive the DL grant from the 5G network for receiving a response to the specific information (DL grant receiving step, S34).

The autonomous vehicle 1000 may receive remote control related information (or a signal) from the 5G network based on the DL grant (remote control related information receiving step, S35).

A beam management (BM) process may be added to the initial access step, and a beam failure recovery process associated with Physical Random Access Channel (PRACH) transmission may be added to the random access step. QCL (Quasi Co-Located) relation may be added with respect to the beam reception direction of a Physical Downlink Control Channel (PDCCH) including the UL grant in the UL grant receiving step, and QCL relation may be added with respect to the beam transmission direction of the Physical Uplink Control Channel (PUCCH)/Physical Uplink Shared Channel (PUSCH) including specific information in the specific information transmission step. Further, a QCL relationship may be added to the DL grant reception step with respect to the beam receiving direction of the PDCCH including the DL grant.

Figure 7:
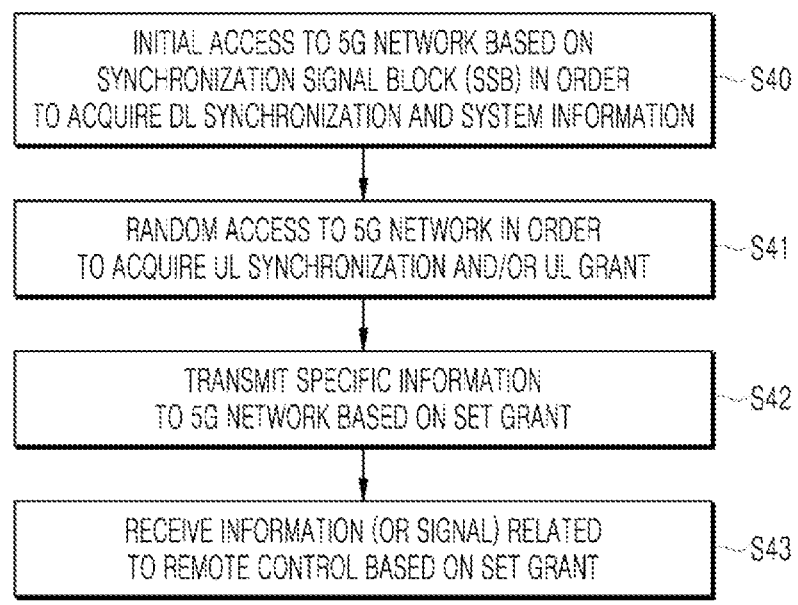

As illustrated in FIG. 7, the autonomous vehicle 1000 may perform an initial access process with the 5G network based on SSB for acquiring DL synchronization and system information (initial access step, S40).

The autonomous vehicle 1000 may perform a random access process with the 5G network for UL synchronization acquisition and/or UL transmission (random access step, S41).

The autonomous vehicle 1000 may transmit specific information based on a configured grant to the 5G network (UL grant receiving step, S42). That is, the autonomous vehicle 1000 may receive the configured grant instead of receiving a UL grant from the 5G network.

Furthermore, the autonomous vehicle 1000 receives, from the 5G network, the remote control-related information (or signal) on the basis of the configured grant (remote control-related information receiving step, S43).

Figure 8:
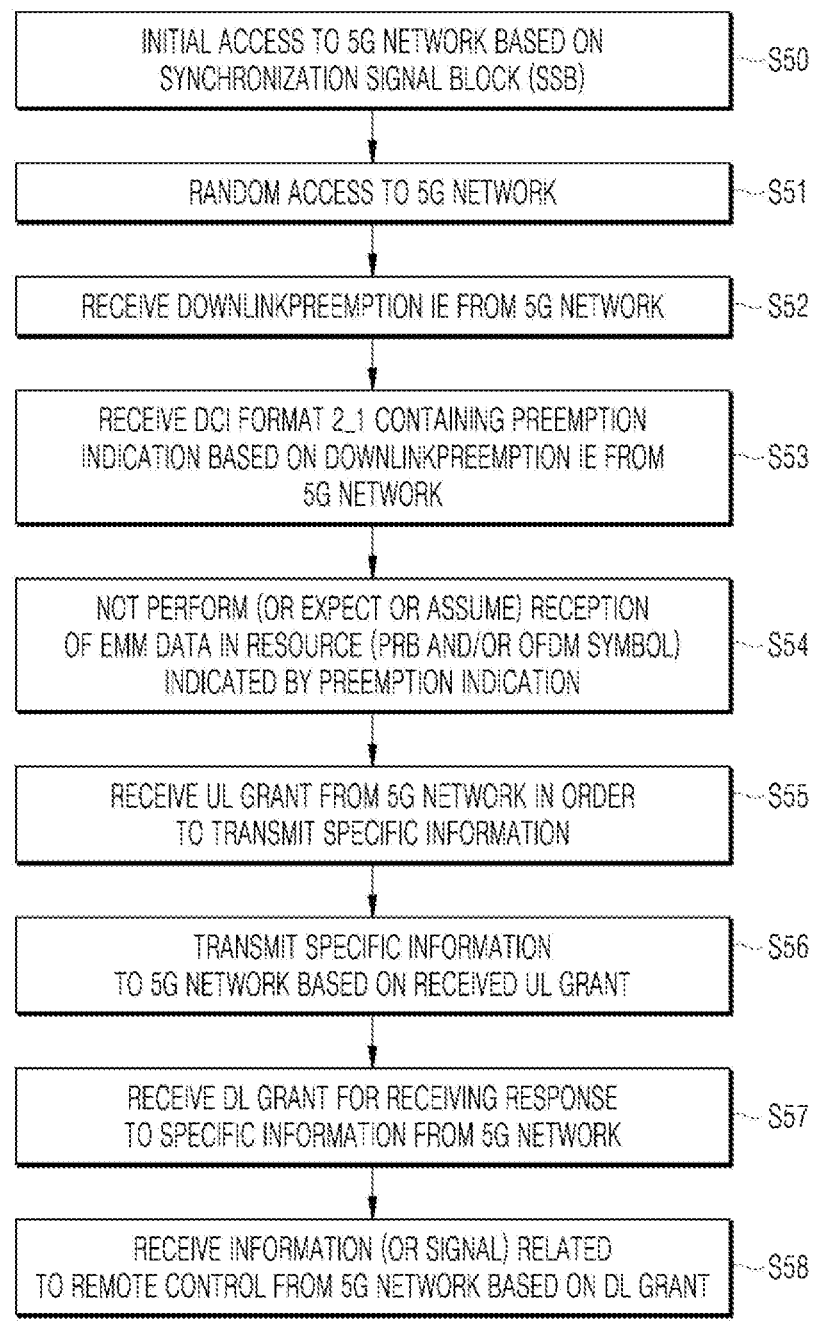

As illustrated in FIG. 8, the autonomous vehicle 1000 may perform an initial access process with the 5G network based on SSB for acquiring DL synchronization and system information (initial access step, S50).

The autonomous vehicle 1000 may perform a random access process with the 5G network for UL synchronization acquisition and/or UL transmission (random access step, S51).

In addition, the autonomous vehicle 1000 may receive Downlink Preemption (DL) and Information Element (IE) from the 5G network (DL Preemption IE reception step, S52).

The autonomous vehicle 1000 may receive DCI (Downlink Control Information) format 2_1 including preemption indication based on the DL preemption IE from the 5G network (DCI format 2_1 receiving step, S53).

The autonomous vehicle 1000 may not perform (or expect or assume) the reception of eMBB data in the resource (PRB and/or OFDM symbol) indicated by the pre-emption indication (step of not receiving eMBB data, S54).

The autonomous vehicle 1000 may receive the UL grant over the 5G network for transmitting specific information (UL grant receiving step, S55).

The autonomous vehicle 1000 may transmit the specific information to the 5G network based on the UL grant (specific information transmission step, S56).

The autonomous vehicle 1000 may receive the DL grant from the 5G network for receiving a response to the specific information (DL grant receiving step, S57).

The autonomous vehicle 1000 may receive the remote control related information (or signal) from the 5G network based on the DL grant (remote control related information receiving step, S58).

Figure 9:
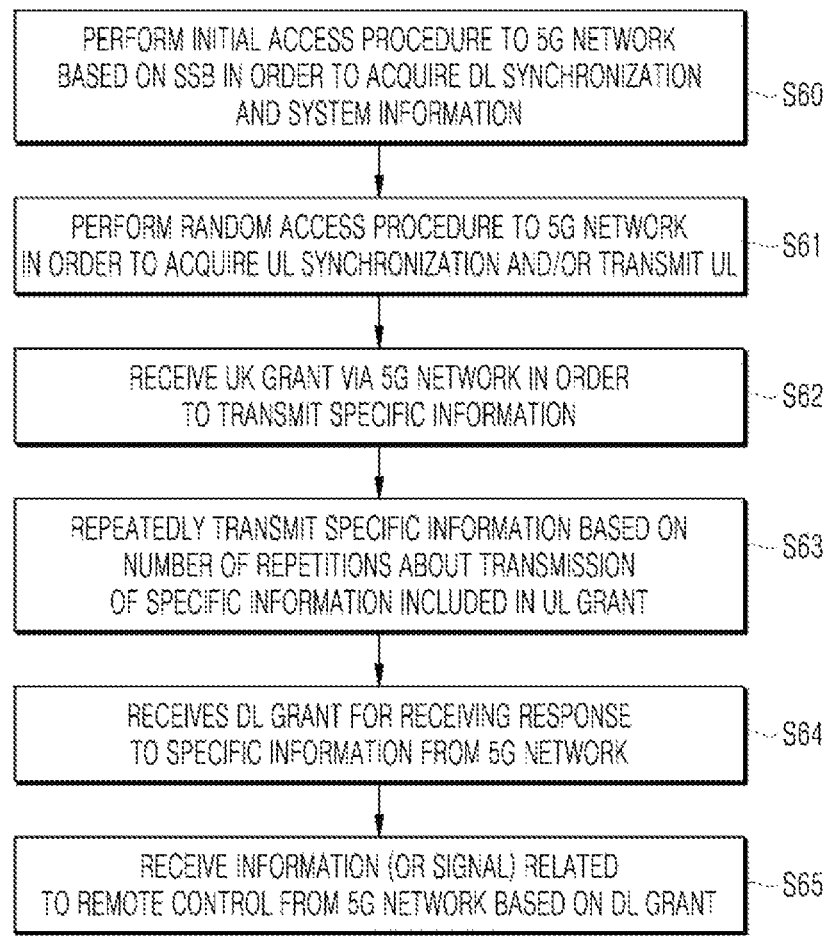

As illustrated in FIG. 9, the autonomous vehicle 1000 may perform an initial access process with the 5G network based on SSB for acquiring DL synchronization and system information (initial access step, S60).

The autonomous vehicle 1000 may perform a random access process with the 5G network for UL synchronization acquisition and/or UL transmission (random access step, S61).

The autonomous vehicle 1000 may receive the UL grant over the 5G network for transmitting specific information (UL grant receiving step, S62).

When specific information is transmitted repeatedly, the UL grant may include information on the number of repetitions, and the specific information may be repeatedly transmitted based on information on the number of repetitions (specific information repetition transmission step, S63).

The autonomous vehicle 1000 may transmit the specific information to the 5G network based on the UL grant.

Also, the repetitive transmission of specific information may be performed through frequency hopping, the first specific information may be transmitted in the first frequency resource, and the second specific information may be transmitted in the second frequency resource.

The specific information may be transmitted through Narrowband of Resource Block (6RB) and Resource Block (1RB).

The autonomous vehicle 1000 may receive the DL grant from the 5G network for receiving a response to the specific information (DL grant receiving step, S64).

The autonomous vehicle 1000 may receive the remote control related information (or signal) from the 5G network based on the DL grant (remote control related information receiving step, S65).

The above-described 5G communication technique can be applied in combination with the embodiment proposed in this specification, which will be described in FIG. 1 to FIG. 15*b*, or supplemented to specify or clarify the technical feature of the embodiment proposed in this specification.

The vehicle 1000 may be connected to an external server through a communication network, and may be capable of moving along a predetermined route without a driver's intervention by using an autonomous driving technique.

In the following embodiments, the user may be interpreted as a driver, a passenger, or the owner of a user terminal.

While the vehicle 1000 is driving in the autonomous driving mode, the type and frequency of accident occurrence may depend on the capability of the vehicle 1000 of sensing dangerous elements in the vicinity in real time. The route to the destination may include sectors having different levels of risk due to various causes such as weather, terrain characteristics, traffic congestion, and the like.

At least one among an autonomous vehicle, a user terminal, and a server according to embodiments of the present disclosure may be associated or integrated with an artificial intelligence module, a drone (unmanned aerial vehicle (UAV)), a robot, an augmented reality (AR) device, a virtual reality (VR) device, a 5G service related device, and the like.

For example, the vehicle 1000 may operate in association with at least one artificial intelligence module or robot included in the vehicle 1000 in the autonomous driving mode.

For example, the vehicle 1000 may interact with at least one robot. The robot may be an autonomous mobile robot (AMR) capable of driving by itself. Being capable of driving by itself, the AMR may freely move, and may include a plurality of sensors so as to avoid obstacles during traveling. The AMR may be a flying robot (such as a drone) equipped with a flight device. The AMR may be a wheel-type robot equipped with at least one wheel, and which is moved through the rotation of the at least one wheel. The AMR may be a leg-type robot equipped with at least one leg, and which is moved using the at least one leg.

The robot may function as a device that enhances the convenience of a user of a vehicle. For example, the robot may move a load placed in the vehicle 1000 to a final destination. For example, the robot may perform a function of providing route guidance to a final destination to a user who alights from the vehicle 1000. For example, the robot may perform a function of transporting the user who alights from the vehicle 1000 to the final destination.

At least one electronic apparatus included in the vehicle 1000 may communicate with the robot through a communication device.

At least one electronic apparatus included in the vehicle 1000 may provide, to the robot, data processed by the at least one electronic apparatus included in the vehicle 1000. For example, at least one electronic apparatus included in the vehicle 1000 may provide, to the robot, at least one among object data indicating an object near the vehicle, HD map data, vehicle status data, vehicle position data, and driving plan data.

At least one electronic apparatus included in the vehicle 1000 may receive, from the robot, data processed by the robot. At least one electronic apparatus included in the vehicle 1000 may receive at least one among sensing data sensed by the robot, object data, robot status data, robot location data, and robot movement plan data.

At least one electronic apparatus included in the vehicle 1000 may generate a control signal based on data received from the robot. For example, at least one electronic apparatus included in the vehicle may compare information on the object generated by an object detection device with information on the object generated by the robot, and generate a control signal based on the comparison result. At least one electronic apparatus included in the vehicle 1000 may generate a control signal so that a movement route of a vehicle and a movement route of a robot do not interfere with each other.

At least one electronic apparatus included in the vehicle 1000 may include a software module or a hardware module for implementing an artificial intelligence (AI) (hereinafter referred to as an artificial intelligence module). At least one electronic device included in the vehicle may input the acquired data to the AI module, and use the data which is outputted from the AI module.

The artificial intelligence module may perform machine learning of input data by using at least one artificial neural network (ANN). The artificial intelligence module may output driving plan data through machine learning of input data.

At least one electronic apparatus included in the vehicle 1000 may generate a control signal based on the data outputted from the artificial intelligence module.

According to the embodiment, at least one electronic apparatus included in the vehicle 1000 may receive data processed by an artificial intelligence from an external device through a communication device. At least one electronic apparatus included in the vehicle may generate a control signal based on the data processed by the artificial intelligence.

The vehicle controller 1200 may receive a control signal of an autonomous driving control server via the vehicle transmitter and/or receiver 1100, and may control an autonomous mode operation according to the control signal.

The vehicle controller 1200 may obtain vehicle information, and may determine, on the basis of the obtained vehicle information, whether vehicle management is required, i.e., whether there is a vehicle-related task which is so important that the user is required to intervene and make a decision.

The vehicle controller 1200 may obtain the vehicle information via the vehicle transmitter and/or receiver 1100, a navigation module, or a vehicle controller area network (CAN).

The vehicle 1200 may analyze the vehicle information to determine that vehicle management, for example, a waypoint change to a gas station or repair shop, is required when an emergency situation that disrupts operation of the vehicle 1000 occurs, for example, when refueling is required or an operation error occurs in an electronic control unit (ECU), when a destination is changed due to a change in a schedule of the occupant, or when a situation pre-designated by the occupant occurs.

When it is necessary for the user to intervene in a vehicle-related task during execution of the user game, the vehicle controller 1200 may execute the intention recognition game which is executed in an independent area, which is switched from and independent of a user game execution area, within the user game execution area, and may generate a signal for controlling the vehicle 1000 on the basis of information generated according to execution of the intention recognition game in which a user input signal is reflected.

The intention recognition game, which is a game for determining a user's intention about a vehicle-related task, may induce the user to input the user's intention about vehicle management, such as gas station selection, by way of selecting one route among a plurality of travel routes of a game player or selecting one item among a plurality of items obtainable by the game player.

The vehicle controller 1200 may store, in the vehicle storage 1900, the user's intention determined on the basis of the user input signal input during execution of the intention recognition game in association with the vehicle information achieved when the user input signal is input, and may generate, when obtained vehicle information matches the vehicle information stored in the vehicle storage 1900, a signal for controlling the vehicle 1000 according to a user's intention matched to the stored vehicle information without executing the intention recognition game.

That is, the vehicle controller 1200 may generate and store, in the vehicle storage 1900, a vehicle management database to automatically perform vehicle management by recognizing an intention of the occupant.

The vehicle controller 1200 may generate initial learning data on the basis of a plurality of pieces of vehicle information stored in the storage and user's intentions matched to the vehicle information, may allow the occupant to check garbage data with regard to the generated initial learning data via the vehicle user interface 1300, may refine, on the basis of a result of the garbage data checking, the initial learning data to achieve final learning data in which a user's intention is reflected without an error, may generate a prediction model by performing machine learning on the basis of the refined final learning data, and may generate a signal for controlling the vehicle 1000 according to a user's intention predicted by the prediction model without executing the intention recognition game since the prediction model is generated.

That is, the vehicle controller 1200 may generate and store, in the vehicle storage 1900, the prediction model achieved by machine learning to automatically perform vehicle management by recognizing an intention of the occupant.

The artificial intelligence (AI) is one field of computer science and information technology that studies methods to make computers mimic intelligent human behaviors such as reasoning, learning, self-improving and the like.

In addition, the artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

Specifically, the Machine Learning can be a technology for researching and constructing a system for learning, predicting, and improving its own performance based on empirical data and an algorithm for the same. The algorithms of the Machine Learning take a method of constructing a specific model in order to obtain the prediction or the determination based on the input data, rather than performing the strictly defined static program instructions.

Many Machine Learning algorithms have been developed on how to classify data in the Machine Learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. In addition, the Artificial Neural Network can include the synapse for connecting between neuron and neuron.

An ANN may be defined by the following three factors: (1) a connection pattern between neurons on different layers; (2) a learning process that updates synaptic weights; and (3) an activation function generating an output value from a weighted sum of inputs received from a lower layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein.

In general, a single-layer neural network may include an input layer and an output layer.

Further, in general, a multi-layer neural network may include an input layer, one or more hidden layers, and an output layer.

The Input layer is a layer that accepts external data, the number of neurons in the Input layer is equal to the number of input variables, and the Hidden layer is disposed between the Input layer and the Output layer and receives a signal from the Input layer to extract the characteristics to transfer it to the Output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron can be activated and output an output value obtained through an activation function.

In the meantime, a deep neural network with a plurality of hidden layers between the input layer and the output layer may be the most representative type of artificial neural network which enables deep learning, which is one machine learning technique.

The Artificial Neural Network can be trained by using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data can classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network can be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Further, throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process (MDP).

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters can be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

When it is determined that vehicle management is required, the vehicle controller 1200 may receive, from the game providing server 3000, the intention recognition game via the vehicle transmitter and/or receiver 1100.

The vehicle controller 1200 may receive an input of a fuel state, a vehicle defect state, a driver preference, or a scheduled travel route as the vehicle information, and may determine whether vehicle management is required.

When the vehicle controller 1200 obtains the vehicle information indicating a shortage of a remaining energy source, a vehicle component failure, or approach of a gas station or repair shop preferred by the driver, the vehicle controller 1200 may add up scores assigned to each vehicle information item to determine whether vehicle management is required if a total score exceeds a predetermined score.

Here, the vehicle controller 1200 may assign weights according to an importance of each item and may add up values obtained by multiplying the assigned scores by the weights to determine whether vehicle management is required.

For example, the vehicle controller 1200 may assign a weight of 7 to a serious situation such as a shortage of a remaining energy source, a vehicle component failure, or the like, and may assign a weight of 2.5 to a preference-related situation such as approach of a gas station preferred by the driver.

The vehicle controller 1200 may be implemented using at least one among application specific integrated circuits (ASICs), digital signal processors (DSPs), digital signal processing devices (DSPDs), programmable logic devices (PLDs), field [programmable gate arrays (FPGAs), processors, controllers, micro-controllers, microprocessors, and other electronic units for performing other functions.

The vehicle user interface 1300 may allow interaction between the vehicle 1000 and a vehicle user, receive an input signal of the user, transmit the received input signal to the vehicle controller 1200, and provide information included in the vehicle 1000 to the user under the control of the vehicle controller 1200.

The vehicle user interface 1300 may receive and transfer a user input signal to the vehicle controller 1200, and may provide a screen according to the execution of the user game or the intention recognition game.

The vehicle user interface 1300 may include, but is not limited to, an input module, an internal camera, a bio-sensing module, and an output module.

The input module is for receiving information from a user. The data collected by the input module may be analyzed by the vehicle controller 1200 and processed by the user's control command.

The input module may receive the destination of the vehicle 1000 from the user and provide the destination to the controller 1200.

The input module may input to the vehicle controller 2200 a signal for designating and deactivating at least one of the plurality of sensor modules of the object detector 1400 according to the user's input.

The input module may be disposed inside the vehicle. For example, the input module may be disposed in one area of a steering wheel, one area of an instrument panel, one area of a seat, one area of each pillar, one area of a door, one area of a center console, one area of a head lining, one area of a sun visor, one area of a windshield, or one area of a window.

The output module is for generating an output related to visual, auditory, or tactile information. The output module may output a sound or an image.

The output module may include at least one of a display module, an acoustic output module, and a haptic output module.

The display module may display graphic objects corresponding to various information.

The display module may include at least one of a liquid crystal display (LCD), a thin film transistor liquid crystal display (TFT LCD), an organic light emitting diode (OLED), a flexible display, a 3D display, or an e-ink display.

The display module may form an interactive layer structure with a touch input module, or may be integrally formed with the touch input module to implement a touch screen.

The display module may be implemented as a head up display (HUD). When the display module is implemented as an HUD, the display module may include a project module, and output information through an image projected onto a windshield or a window.

The display module may include a transparent display. The transparent display may be attached to the windshield or the window.

The transparent display may display a predetermined screen with a predetermined transparency. The transparent display may include at least one of a transparent thin film electroluminescent (TFEL), a transparent organic light-emitting diode (OLED), a transparent liquid crystal display (LCD), a transmissive transparent display, or a transparent light emitting diode (LED). The transparency of the transparent display may be adjusted.

The vehicle user interface 1300 may include a plurality of display modules.

The display module may be disposed in one area of the steering wheel, one area of the instrument panel, one area of the seat, one area of each pillar, one area of the door, one area of the center console, one area of the head lining, or one area of the sun visor, or may be implemented on one area of the windshield or one area of the window.

The sound output module may convert an electrical signal provided from the vehicle controller 1200 into an audio signal. The sound output module may include at least one speaker.

The haptic output module may generate a tactile output. For example, the haptic output module may operate to allow the user to perceive the output by vibrating a steering wheel, a seat belt, and a seat.

The object detector 1400 is for detecting an object located outside the vehicle 1000. The object detector 2400 may generate object information based on the sensing data, and transmit the generated object information to the vehicle controller 1200. Examples of the object may include various objects related to the driving of the vehicle 1000, such as a lane, another vehicle, a pedestrian, a motorcycle, a traffic signal, light, a road, a structure, a speed bump, a landmark, and an animal.

The object detector 1400 may include, as a plurality of sensor modules, a camera module, light imaging detection and ranging (LIDAR), an ultrasonic sensor, radio detection and ranging (RADAR), and an infrared sensor.

The object detector 1400 may sense environmental information around the vehicle 1000 through a plurality of sensor modules.

Depending on the embodiment, the object detector 1400 may further include components other than the components described, or may not include some of the components described.

The radar may include an electromagnetic wave transmitting module and an electromagnetic wave receiving module. The radar may be implemented using a pulse radar method or a continuous wave radar method in terms of radio wave emission principle. The radar may be implemented using a frequency modulated continuous wave (FMCW) method or a frequency shift keying (FSK) method according to a signal waveform in a continuous wave radar method.

The radar may detect an object based on a time-of-flight (TOF) method or a phase-shift method using an electromagnetic wave as a medium, and detect the location of the detected object, the distance to the detected object, and the relative speed of the detected object.

The radar may be disposed at an appropriate position outside the vehicle for sensing an object disposed at the front, back, or side of the vehicle.

The lidar may include a laser transmitting module, and a laser receiving module. The lidar may be embodied using the time of flight (TOF) method or in the phase-shift method.

The lidar may be implemented using a driving method or a non-driving method.

When the lidar is embodied in the driving method, the lidar may rotate by means of a motor, and detect an object near the vehicle 1000. When the lidar is implemented in the non-driving method, the lidar may detect an object within a predetermined range with respect to the vehicle 1000 by means of light steering. The vehicle 1000 may include a plurality of non-driven type lidars.

The lidar may detect an object using the time of flight (TOF) method or the phase-shift method using laser light as a medium, and detect the location of the detected object, the distance from the detected object and the relative speed of the detected object.

The lidar may be disposed at an appropriate position outside the vehicle for sensing an object disposed at the front, back, or side of the vehicle.

An imaging unit may be positioned in an appropriate location outside the vehicle, for example, a front portion, rear portion, right side mirror, or left side mirror of the vehicle, in order to obtain a vehicle outside image. The imaging unit may be a mono camera, but is not limited thereto, and may be a stereo camera, an around view monitoring (AVM) camera, or a 360-degree camera.

The imaging unit may be disposed adjacent to a front wind shield in the vehicle to obtain an image of an environment in front of the vehicle. Alternatively, the imaging unit may be disposed near a front bumper or radiator grill.

The imaging unit may be disposed adjacent to a rear glass in the vehicle to obtain an image of an environment in a rear of the vehicle. Alternatively, the imaging unit may be disposed near a rear bumper, a trunk, or a tail gate.

The imaging unit may be disposed adjacent to at least one among side windows in the vehicle to obtain an image of an environment on a side of the vehicle. Furthermore, the imaging unit may be disposed near a fender or a door.

The ultrasonic sensor may include an ultrasonic transmitting module, and an ultrasonic receiving module. The ultrasonic sensor may detect an object based on ultrasonic waves, and detect the location of the detected object, the distance from the detected object, and the relative speed of the detected object.

The ultrasonic sensor may be disposed at an appropriate position outside the vehicle for sensing an object at the front, back, or side of the vehicle.

The infrared sensor may include an infrared transmitting module, and an infrared receiving module. The infrared sensor may detect an object based on infrared light, and detect the location of the detected object, the distance from the detected object, and the relative speed of the detected object.

The infrared sensor may be disposed at an appropriate position outside the vehicle for sensing an object at the front, back, or side of the vehicle.

The vehicle controller 1200 may control the overall operation of each module of the object detector 1400.

The vehicle controller 1200 may compare data sensed by the radar, the lidar, the ultrasonic sensor, and the infrared sensor with pre-stored data so as to detect or classify an object.

The vehicle controller 1200 may detect an object and perform tracking of the object based on the obtained image. The vehicle controller 1200 may perform operations such as calculation of the distance from an object and calculation of the relative speed of the object through image processing algorithms.

For example, the vehicle controller 1200 may obtain the distance information from the object and the relative speed information of the object from the obtained image based on the change of size of the object over time.

For example, the vehicle controller 1200 may obtain the distance information from the object and the relative speed information of the object through, for example, a pin hole model or road surface profiling.

The vehicle controller 1200 may detect an object and perform tracking of the object based on the reflected electromagnetic wave reflected back from the object. The vehicle controller 1200 may perform operations such as calculation of the distance to the object and calculation of the relative speed of the object based on the electromagnetic waves.

The vehicle controller 1200 may detect an object, and perform tracking of the object based on the reflected laser light reflected back from the object. Based on the laser light, the vehicle controller 1200 may perform operations such as calculation of the distance to the object and calculation of the relative speed of the object based on the laser light.

The vehicle controller 1200 may detect an object and perform tracking of the object based on the reflected ultrasonic wave reflected back from the object. The vehicle controller 1200 may perform operations such as calculation of the distance to the object and calculation of the relative speed of the object based on the reflected ultrasonic wave.

The vehicle controller 1200 may detect an object and perform tracking of the object based on the reflected infrared light reflected back from the object. The vehicle controller 1200 may perform operations such as calculation of the distance to the object and calculation of the relative speed of the object based on the infrared light.

Depending on the embodiment, the object detector 1400 may include a separate processor from the vehicle processor 1200. In addition, the radar, the lidar, the ultrasonic sensor, and the infrared sensor may each include a processor.

When a processor is included in the object detector 1400, the object detector 1400 may be operated under the control of the processor controlled by the vehicle controller 1200.

The driving controller 1500 may receive a user input for driving. In the case of the manual mode, the vehicle 1000 may be driven on the basis of a signal provided by the driving manipulator 1500.

The driving manipulator 1500 may be used as an input module of the intention recognition game when the intention recognition game is executed in a form of a vehicle driving game via a display module of the user interface 1300.

The vehicle driver 1600 may electrically control the driving of various apparatuses in the vehicle 1000. The vehicle driver 1600 may electrically control operation of a power train, chassis, door/window, safety device, lamp, and air conditioner in the vehicle 1000.

The operator 1700 may control various operations of the vehicle 1000. The operator 1700 may operate in the autonomous driving mode.

The operator 1700 may operate the vehicle 1000 according to a vehicle control signal generated by the vehicle controller 1200 on the basis of the intention recognition game, the prediction model, or the database stored in the vehicle storage 1900.

The operator 1700 may include a driving module, an unparking module, and a parking module.

Depending on the embodiment, the operator 1700 may further include constituent elements other than the constituent elements to be described, or may not include some of the constitute elements.

The operator 1700 may include a processor under the control of the vehicle controller 1200. Each module of the operator 1700 may include a processor individually.

Depending on the embodiment, when the operator 1700 is implemented as software, it may be a sub-concept of the vehicle controller 1200.

The driving module may perform driving of the vehicle 1000.

The driving module may receive object information from the object detection unit 1400, and provide a control signal to a vehicle driving module to perform the driving of the vehicle 1000.

The driving module may receive a signal from an external device through the vehicle transmitter and/or receiver 1100, and provide a control signal to the vehicle driving module to perform the driving of the vehicle 1000.

The unparking module may perform unparking of the vehicle 1000.

The unparking module may receive navigation information from the navigation module, and provide a control signal to the vehicle driving module to perform unparking of the vehicle 1000.

The unparking module may receive object information from the object detection unit 1400, and provide a control signal to the vehicle driving module to perform unparking of the vehicle 1000.

The unparking module may receive a signal from an external device through the vehicle transmitter and/or receiver 1100, and provide a control signal to the vehicle driving module to perform unparking of the vehicle 1000.

The parking module may perform parking of the vehicle 1000.

The parking module may receive navigation information from the navigation module, and provide a control signal to the vehicle driving module to perform the parking of the vehicle 1000.

The parking module may receive object information from the object detection unit 1400, and provide a control signal to the vehicle driving module to perform parking of the vehicle 1000.

The parking module may receive a signal from the external device through the vehicle transmitter and/or receiver 1100, and provide a control signal to the vehicle driving module to perform parking of the vehicle 1000.

The navigation module may provide the navigation information to the vehicle controller 1200. The navigation information may include at least one of map information, set destination information, route information according to destination setting, information about various objects on the route, lane information, or current location information of the vehicle.

The navigation module may provide the vehicle controller 1200 with a parking lot map of the parking lot entered by the vehicle 1000. When the vehicle 1000 enters the parking lot, the vehicle controller 1200 receives the parking lot map from the navigation module, and projects the calculated route and fixed identification information on the provided parking lot map so as to generate the map data.

The navigation module may include a memory. The memory may store navigation information. The navigation information may be updated by information received through the vehicle transmitter and/or receiver 1100. The navigation module may be controlled by an internal processor, or may operate by receiving an external signal, for example, a control signal from the vehicle controller 1200, but the present disclosure is not limited thereto.

The driving module of the operator 1700 may be provided with the navigation information from the navigation module, and may provide a control signal to the vehicle driving module so that driving of the vehicle 1000 may be performed.

The sensor 1800 may sense the state of the vehicle 1000 using a sensor mounted on the vehicle 1000. That is, the sensor 1800 may sense a signal related to the state of the vehicle 1000. The sensor 1800 may obtain movement route information of the vehicle 1000 according to the sensed signal. The sensor 1800 may provide the obtained movement route information to the vehicle controller 1200.

The sensor 1800 may include a posture sensor (for example, a yaw sensor, a roll sensor, and a pitch sensor), a collision sensor, a wheel sensor, a speed sensor, a tilt sensor, a weight sensor, a heading sensor, a gyro sensor, a position module, a vehicle forward/reverse movement sensor, a battery sensor, a fuel sensor, a tire sensor, a steering sensor by rotation of a steering wheel, a vehicle interior temperature sensor, a vehicle interior humidity sensor, an ultrasonic sensor, an illuminance sensor, an accelerator pedal position sensor, a brake pedal position sensor, or the like, but is not limited thereto.

The sensor 1800 may acquire sensing signals for information such as vehicle posture information, vehicle collision information, vehicle direction information, vehicle position information (GPS information), vehicle angle information, vehicle speed information, vehicle acceleration information, vehicle tilt information, vehicle forward/reverse movement information, battery information, fuel information, tire information, vehicle lamp information, vehicle interior temperature information, vehicle interior humidity information, a steering wheel rotation angle, vehicle exterior illuminance, pressure on an acceleration pedal, and pressure on a brake pedal.

The sensor 1800 may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), or the like, but is not limited thereto.

The sensor 1800 may generate vehicle status information based on sensing data. The vehicle state information may be information generated based on data sensed by various sensors provided in the inside of the vehicle.

The vehicle status information may include posture information of the vehicle, speed information of the vehicle, tilt information of the vehicle, weight information of the vehicle, direction information of the vehicle, battery information of the vehicle, fuel information of the vehicle, tire air pressure information of the vehicle, steering information of the vehicle, vehicle interior temperature information, vehicle interior humidity information, pedal position information, vehicle engine temperature information, or the like.

The vehicle storage 1900 may be electrically connected to the vehicle controller 1200. The vehicle storage 1900 may store basic data for each part of a vehicle management game service providing device, control data for controlling operation of each part of the vehicle management game service providing device, and input/output data.

The vehicle storage 1900 may store a user input signal input during the execution of the intention recognition game and vehicle information matched to the user input signal, and may provide stored data to the vehicle controller 1200 according to control of the vehicle controller 1200.

The vehicle storage 1900 may store a prediction model machine-trained to predict a user's intention about vehicle management.

The vehicle storage 1900 may be various storage devices such as a ROM, a RAM, an EPROM, a flash drive, and a hard drive, in terms of hardware. The vehicle storage 1900 may store various data for overall operation of the vehicle 1000, such as a program for processing or controlling the vehicle controller 1200, in particular driver propensity information. The vehicle storage 1900 may be integrally formed with the vehicle controller 1200, or implemented as a sub-component of the vehicle controller 1200.

Figure 3:
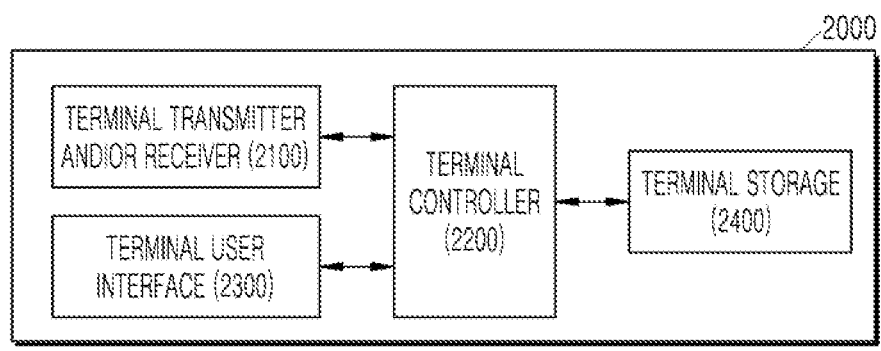
FIG. 3 is a block diagram illustrating a vehicle management game service providing device installed in a user terminal side according to an embodiment of the present disclosure.

FIG. 3 is a block diagram illustrating a vehicle management game service providing device installed in a user terminal side according to an embodiment of the present disclosure.

Referring to FIG. 3, the vehicle management game service providing device may include a terminal transmitter and/or receiver 2100, a terminal controller 2200, a terminal user interface 2300, and a terminal storage 2400.

According to an embodiment, the user terminal 2000 in which the vehicle management game service providing device is applied may include other elements in addition to the elements illustrated in FIG. 3 and described below, or may not include portion of the elements illustrated in FIG. 3 and described below.

The terminal transmitter and/or receiver 2100 may be a module for performing communication with an external device. Herein, the external device may be the user terminal 2000 or the server 3000.

The terminal transmitter and/or receiver 2100 may communicate with the game providing server 3000 which provides information for a user game.

The terminal transmitter and/or receiver 2100 may include at least one of a transmission antenna, a reception antenna, or a radio frequency (RF) circuit and an RF element capable of implementing various communication protocols in order to perform communication.

The terminal transmitter and/or receiver 2100 may support short-range communication using at least one of Bluetooth, RFID, infrared communication, UWB, ZigBee, NFC, Wi-Fi, Wi-Fi Direct, or wireless USB technology.

The terminal controller 2200 may obtain vehicle information, and may determine whether vehicle management is required on the basis of the obtained vehicle information.

The terminal controller 2200 may obtain the vehicle information via the terminal transmitter and/or receiver 2100.

The vehicle controller 2200 may analyze the vehicle information to determine that vehicle management, for example, a waypoint change to a gas station or repair shop, is required when an emergency situation that disrupts operation of the vehicle 1000 occurs, for example, when refueling is required or an operation error occurs in an electronic control unit (ECU), when a destination is changed due to a change in a schedule of the occupant, or when a situation pre-designated by the occupant occurs.

When vehicle management is required during the execution of the user game, the terminal controller 2200 may execute the intention recognition game which is executed in an independent area, which is switched from and independent of a user game execution area, within the user game execution area, and may generate a signal for controlling the vehicle 1000 on the basis of information generated according to the execution of the intention recognition game in which a user input signal is reflected.

The intention recognition game, which is a game for determining a user's intention about vehicle management, may induce the user to input the user's intention about vehicle management, such as gas station selection, by way of selecting one route among a plurality of travel routes of a game player or selecting one item among a plurality of items obtainable by the game player.

The terminal controller 2200 may store, in the terminal storage 2400, the user's intention determined on the basis of the user input signal input during the execution of the intention recognition game in association with the vehicle information achieved when the user input signal is input, and may generate, when obtained vehicle information matches the vehicle information stored in the terminal storage 2400, a signal for controlling the vehicle 1000 according to a user's intention matched to the stored vehicle information without executing the intention recognition game.

That is, the terminal controller 2200 may generate and store, in the terminal storage 2400, a vehicle management database to automatically perform vehicle management by recognizing an intention of the occupant.

The terminal controller 2200 may generate initial learning data on the basis of a plurality of pieces of vehicle information stored in the storage and user's intentions matched to the vehicle information, may allow the occupant to check garbage data with regard to the generated initial learning data via the terminal user interface 2300, may refine, on the basis of a result of the garbage data checking, the initial learning data to achieve final learning data in which a user's intention is reflected without an error, may generate a prediction model by performing machine learning on the basis of the refined final learning data, and may generate a signal for controlling the vehicle 1000 according to a user's intention predicted by the prediction model without executing the intention recognition game since the prediction model is generated.

That is, the terminal controller 2200 may generate and store, in the terminal storage 2400, the prediction model achieved by machine learning to automatically perform vehicle management by recognizing an intention of the occupant.

Since it is determined that vehicle management is required, the terminal controller 2200 may receive, from the game providing server 3000, the intention recognition game via the terminal transmitter and/or receiver 2100.

The terminal controller 2200 may receive an input of a fuel state, a vehicle defect state, a driver preference, or a scheduled travel route as the vehicle information, and may determine whether vehicle management is required.

When the terminal controller 2200 obtains the vehicle information indicating a shortage of a remaining energy source, a vehicle component failure, or approach of a gas station or repair shop preferred by the driver, the terminal controller 2200 may add up scores assigned to each vehicle information item to determine whether vehicle management is required if a total score exceeds a predetermined score.

Here, the terminal controller 2200 may assign weights according to an importance of each item and may add up values obtained by multiplying the assigned scores by the weights to determine whether vehicle management is required.

For example, the terminal controller 2200 may assign a weight of 7 to a serious situation such as a shortage of a remaining energy source, a vehicle component failure, or the like, and may assign a weight of 2.5 to a preference-related situation such as approach of a gas station preferred by the driver.

The terminal controller 2200 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units for performing other functions.

The terminal user interface 2300 may allow interaction between the user terminal 2000 and the user, receive an input signal of the user, transmit the received input signal to the terminal controller 2200, and provide information held in the user terminal 2000 to the user under the control of the vehicle controller 2200.

The terminal user interface 2300 may receive and transfer a user input signal to the terminal controller 2200, and may provide a screen according to the execution of the user game or the intention recognition game.

The terminal storage 2400 is electrically connected to the terminal controller 2200. The terminal storage 2400 may store basic data for each part of the vehicle management game service providing device, control data for controlling operation of each part of the vehicle management game service providing device, and input/output data.

The terminal storage 2400 may store a user input signal input during the execution of the intention recognition game and vehicle information matched to the user input signal, and may provide stored data to the terminal controller 2200 according to control of the vehicle controller 2200.

The terminal storage 2400 may store a prediction model machine-trained to predict a user's intention about vehicle management.

The terminal storage 2400 may be various storage devices such as a ROM, a RAM, an EPROM, a flash drive, and a hard drive, in terms of hardware. The terminal storage 2400 may store a program for processing or controlling of the terminal controller 2200. The terminal storage 2400 may be integrally formed with the terminal controller 2200, or implemented as a sub-component of the vehicle controller 2200.

FIGS. 10 to 14 are operation flowcharts illustrating a vehicle management game service providing method according to an embodiment of the present disclosure.

Figure 15A:
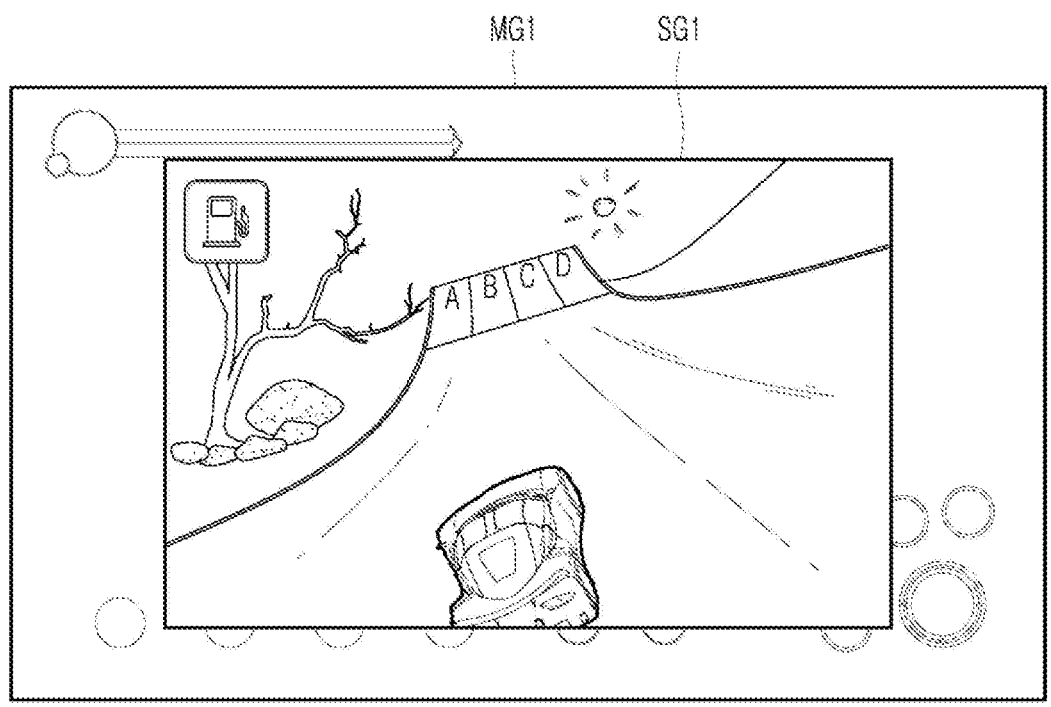
FIGS. 15A and 15B are diagrams illustrating game execution screens of a vehicle management game service providing device according to an embodiment of the present disclosure.
Figure 15B:
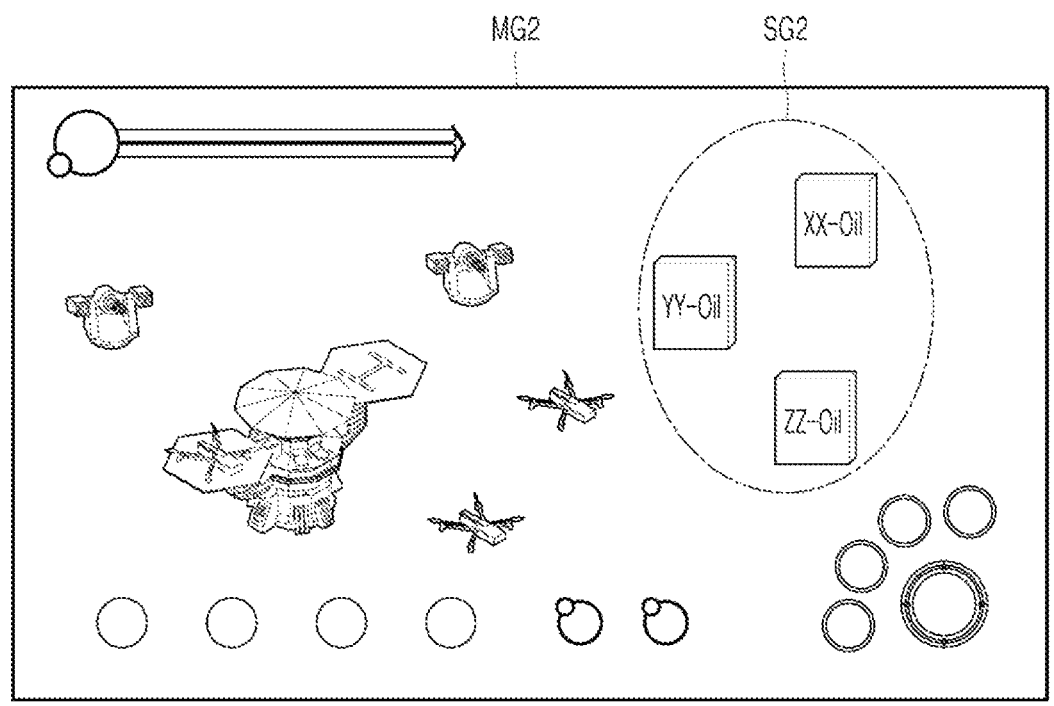

FIGS. 15A and 15B are diagrams illustrating interface screens of a vehicle management game service providing device according to an embodiment of the present disclosure.

The vehicle management game service providing method according to an embodiment of the present disclosure and the vehicle management game service providing device according to an embodiment of the present disclosure are described below with reference to FIGS. 10 to 15B.

Figure 10:
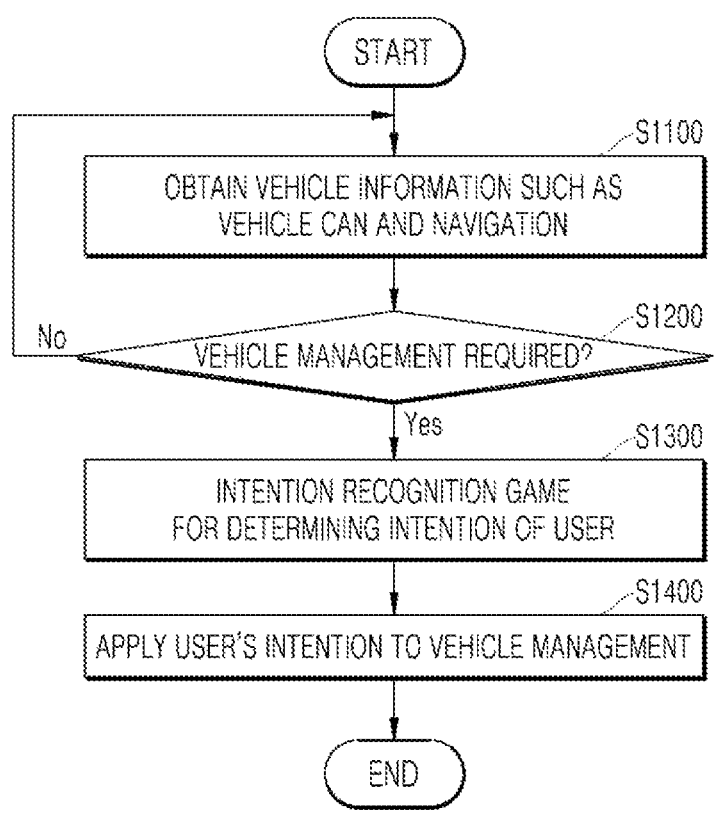
FIG. 10 is an operation flowchart illustrating a vehicle management game service providing method according to an embodiment of the present disclosure.

Referring to FIG. 10, the vehicle controller 1200 may obtain vehicle information via the vehicle transmitter and/or receiver 1100, a vehicle CAN, or a navigation module (S1100).

Meanwhile, the terminal controller 2200 may obtain the vehicle information via the terminal transmitter and/or receiver 2100.

The vehicle controller 1200 or the terminal controller 2200 may determine whether vehicle management is required on the basis of the obtained vehicle information (S1200).

For example, the vehicle controller 1200 or the terminal controller 2200 may analyze the vehicle information to determine whether an emergency situation that disrupts operation of the vehicle 1000 occurs, for example, whether refueling is required or an ECU operation error occurs, whether a destination is changed due to a change in a schedule of the occupant, or whether a situation pre-designated by the occupant occurs.

The vehicle controller 1200 or the terminal controller 2200 may return to the operation of obtaining the vehicle information when vehicle management is not required (S1100).

When vehicle management is required, the vehicle controller 1200 or the terminal controller 2200 may execute the intention recognition game which is executed in an independent area, which is switched from and independent of a user game execution area, within the user game execution area (S1300).

Here, the intention recognition game may be a vehicle driving game SG1, which is executed within an additional sub screen during execution of a user game MG1 that is a strategic simulation game and in which one route is selected from among a plurality of travel routes A, B, C, and D, as illustrated in FIG. 15A, or may be an event game SG2 in which a plurality of items (XX-gas station, YY-gas station, ZZ-gas station) obtainable by a game player appear so that one of the items may be selected during execution of a user game MG2 that is a strategic simulation game, as illustrated in FIG. 15B.

The vehicle controller 1200 or the terminal controller 2200 may generate a signal for controlling the vehicle 1000 on the basis of information generated according to the execution of the intention recognition game in which a user input signal is reflected (S1400).

For example, when the route A is selected from among the plurality of travel routes A, B, C, and D in the vehicle driving game SG1 executed within the additional sub screen during the execution of the user game MG1 that is a strategic simulation game, the vehicle controller 1200 or the terminal controller 2200 may generate a signal for controlling to change a waypoint of the vehicle 1000 to a gas station A, and when the item ZZ-gas station is selected from among the plurality of items XX-gas station, YY-gas station, and ZZ-gas station which appear when refueling is required or a gas station is nearby during the execution of the user game MG2 that is a strategic simulation game, the vehicle controller 1200 or the terminal controller 2200 may generate a signal for controlling to change a waypoint of the vehicle 1000 to a gas station ZZ.

The vehicle controller 1200 or the terminal controller 2200 may apply the route selection of the vehicle driving game SG1 to control vehicle interiors. For example, front ventilation may be performed when the user selects the route A, rear ventilation may be performed when the user selects the route B, right ventilation may be performed when the user selects the route C, and left ventilation may be performed when the user selects the route D.

Furthermore, the vehicle controller 1200 or the terminal controller 2200 may assign various operations to the plurality of travel routes A, B, C, and D of the vehicle driving game SG1 to control to perform an operation such as receiving a call for the route A, ending a call for the route B, or the like, according to a selected route.

When a user's intervention is required due to cutting-in of another vehicle, the vehicle controller 1200 or the terminal controller 2200 may allow the user to directly control driving of the vehicle using a vehicle driving game which provides an interface screen similar to an actual driving environment.

Furthermore, when a travel route of the vehicle 1000 is shortened as a result of executing the intention recognition game, the vehicle controller 1200 or the terminal controller 2200 may provide a bonus game.

Figure 11:
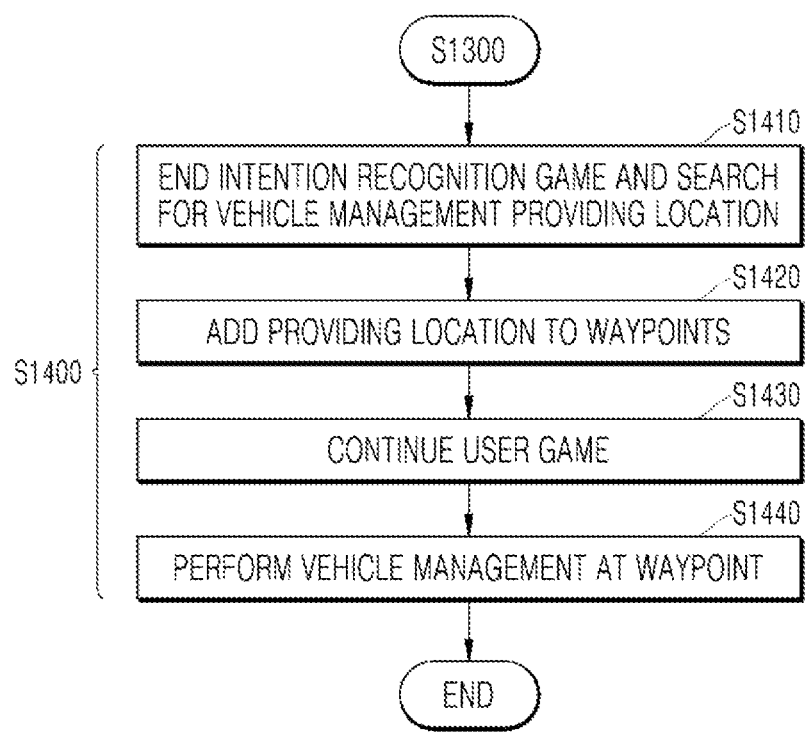
FIGS. 11 and 12 are operation flowcharts illustrating an operation of generating signals for controlling the vehicle for applying the user's intention to vehicle management according to an embodiment of the present disclosure

Referring to FIG. 11, the operation of generating a signal for controlling the vehicle 1000 (S1400) is described in detail below.

The vehicle controller 1200 or the terminal controller 2200 may search for a location of a waypoint or the like for managing the vehicle 1000 according to a user's intention recognized through the intention recognition game (S1410).

The vehicle controller 1200 or the terminal controller 2200 may generate a vehicle control signal for changing a travel route of the vehicle 1000 so as to add, to waypoints of the vehicle 1000, a found location, such as a gas station, for providing a vehicle management service (S1420).

The vehicle controller 1200 or the terminal controller 2200 may end the intention recognition game and may continue the execution of the user game (S1430).

The vehicle controller 1200 or the terminal controller 2200 may control the vehicle 1000 to move to a waypoint at which the vehicle management service is to be provided (S1440).

Figure 12:
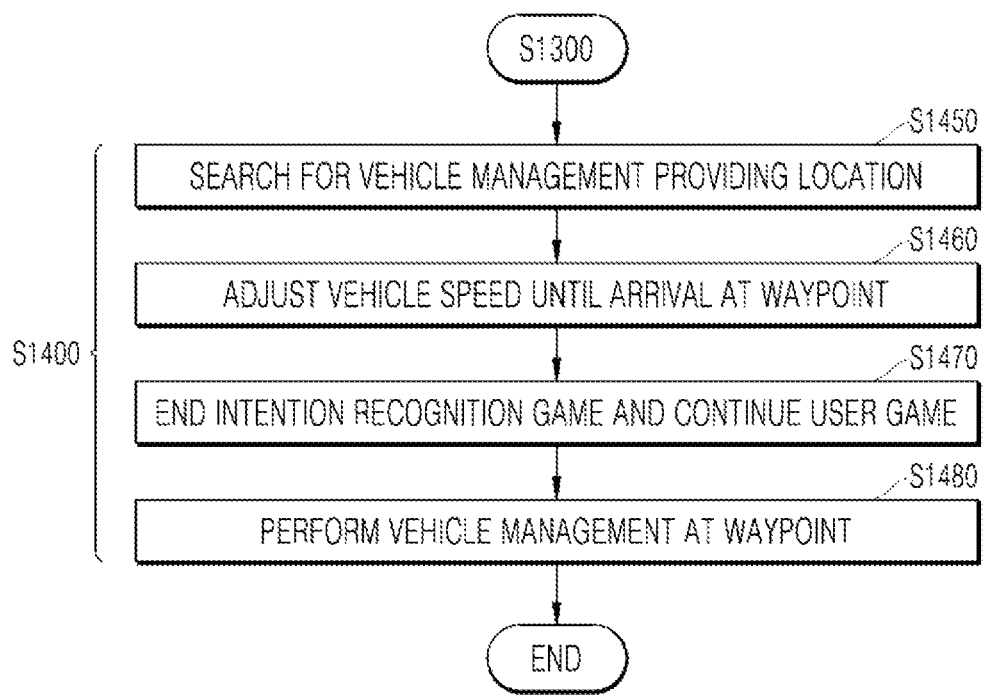

Referring to FIG. 12, the operation of generating a signal for controlling the vehicle 1000 (S1400) may also be performed as below.

The vehicle controller 1200 or the terminal controller 2200 may search for a location of a waypoint or the like for managing the vehicle 1000 according to a user's intention recognized through the intention recognition game (S1450).

When a found location for providing a vehicle management service, for example, a plurality of gas stations, is near the vehicle 1000, the vehicle controller 1200 or the terminal controller 2200 may generate a control signal for adjusting, for example, reducing a speed of the vehicle 1000 until the intention recognition game is ended (S1460). When a waypoint for vehicle management is near the vehicle 1000, the vehicle controller 1200 or the terminal controller 2200 may control the vehicle 1000 to hover around the waypoint until the intention recognition game is ended.

The vehicle controller 1200 or the terminal controller 2200 may end the intention recognition game and may continue the execution of the user game (S1470).

The vehicle controller 1200 or the terminal controller 2200 may control the vehicle 1000 to move to a waypoint at which the vehicle management service is to be provided immediately after the intention recognition game is ended (S1480).

Figure 13:
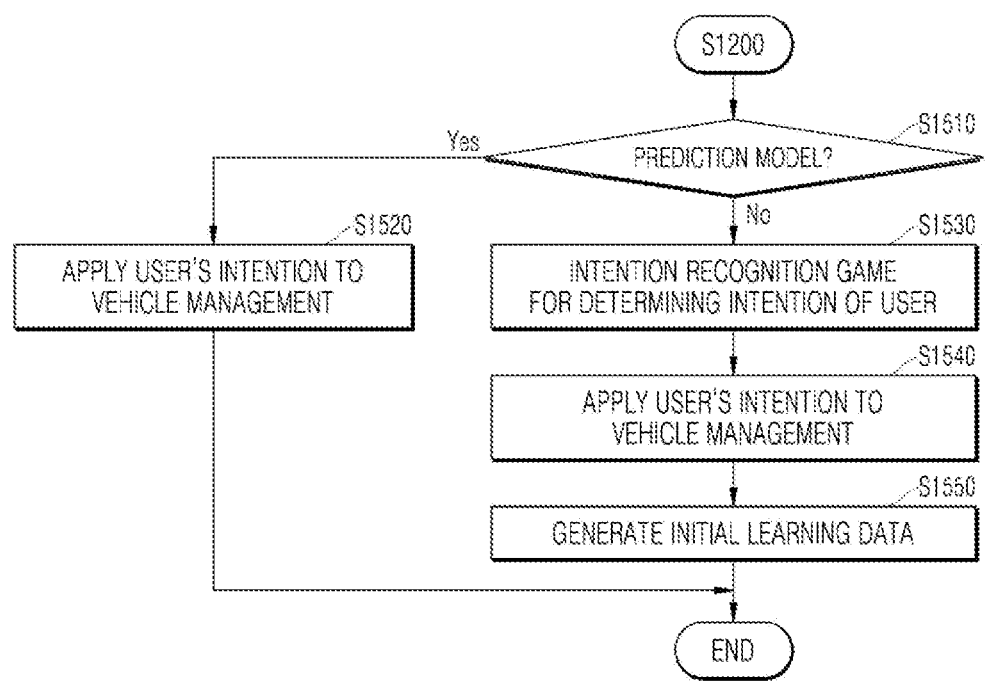
FIG. 13 is an operation flowchart illustrating an operation of recognizing the user's intention for vehicle management with a machine-trained model or a vehicle management game service alternatively according to embodiments of the present disclosure.

Referring to FIG. 13, when vehicle management is required, the vehicle controller 1200 or the terminal controller 2200 may determine whether there is a machine-trained prediction model for automatically performing vehicle management by recognizing the intention of the occupant (S1510).

When the prediction model is already generated, the vehicle controller 1200 or the terminal controller 2200 may generate a signal for controlling the vehicle 1000 according to a user's intention predicted by the prediction model without executing the intention recognition game (S1520).

When there is no generated prediction model, the vehicle controller 1200 or the terminal controller 2200 may execute the intention recognition game which is executed in an independent area, which is switched from and independent of a user game execution area, within the user game execution area, and may generate a signal for controlling the vehicle 1000 on the basis of information generated according to the execution of the intention recognition game in which a user input signal is reflected (S1540).

The vehicle controller 1200 or the terminal controller 2200 may generate initial learning data on the basis of a plurality of pieces of vehicle information and user's intentions matched to the vehicle information, may allow the occupant to check garbage data with regard to the generated initial learning data via the vehicle user interface 1300 or the terminal user interface 2300, may refine, on the basis of a result of the garbage data checking, the initial learning data to achieve final learning data in which a user's intention is reflected without an error, and may generate a prediction model by performing machine learning on the basis of the refined final learning data (S1550).

Figure 14:
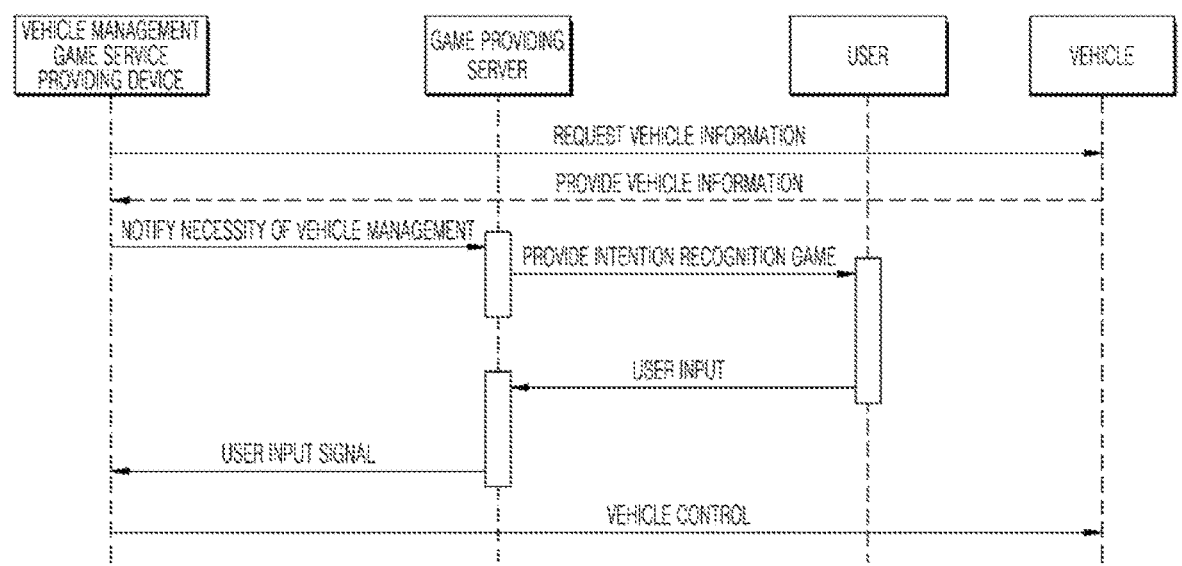
FIG. 14 illustrates operation of a system including a vehicle management game service providing device.

Operation of a system including a vehicle management game service providing device is described below with reference to FIG. 14.

The vehicle management game service providing device may request vehicle information from the vehicle 1000, and may receive the vehicle information in response to the request. The vehicle information may include a communication state and occupant information obtained via a vehicle CAN, a navigation module, a GPS module, a network, a black box, and an internal camera.

The vehicle management game service providing device may notify a game providing server when vehicle management is required as a result of analyzing the vehicle information.

Since the game providing server is notified that vehicle management is required, the game providing server may provide the intention recognition game to the user via an interface provided by the vehicle management game service providing device, may receive a user input according to the execution of the intention recognition game, and may transfer the user input to the vehicle management game service providing device.

The vehicle management game service providing device may perform a control for managing a vehicle according to the user input signal provided by the game providing server. Here, the vehicle management service may include a service of selecting a gas station when a remaining energy amount is small, a service of selecting a ventilation function when ventilation is required, a service of receiving a call, or the like.

When the user game is a single-player game, smooth play of the user game is possible even if the intention recognition game is executed while the user game is temporarily paused. Thus, when the user game is a single-player game, the game providing server may temporarily pause the user game and may control the vehicle management game service providing device to generate and execute the intention recognition game.

The game providing server may receive, from the vehicle management game service providing device, information for generating a game at the same time when the game providing device is notified that vehicle management is required, and may generate the intention recognition game according to the received information for generating a game.

For example, when it is not possible to arrive at a destination since a fuel or battery capacity is not sufficient, or when a gas station or charging station which offers a low price is located on a travel route, the vehicle management game service providing device may provide, to the game providing server, data pertaining to necessity of refueling or charging, information about a plurality of gas stations and charging stations, an estimated time of arrival at the plurality of gas stations and charging stations, and an estimated time of completion of refueling or charging, or the like.

Upon receiving the data for refueling or charging, the game providing server may configure the intention recognition game having a function of allowing the user to select one gas station or charging station from among the plurality of gas stations or charging stations, a function of differentially calculating scores in the game by reflecting advantageous conditions such as a price, travel distance, and the like, and a function of reflecting calculated scores in the user game.

Furthermore, when consumables of the vehicle 1000 are worn out and required to be replaced or when components of the vehicle 1000 do not operate normally, the vehicle management game service providing device may provide, to the game providing server, data pertaining to necessity of vehicle repair, information about a plurality of repair shops, an estimated time of arrival at the plurality of repair shops, and an estimated time of completion of repair, or the like.

Upon receiving the data for vehicle repair, the game providing server may configure the intention recognition game having a function of allowing the user to select one repair shop from among the plurality of repair shops, a function of differentially calculating scores in the game by reflecting advantageous conditions such as a price, travel distance, and the like, and a function of reflecting calculated scores in the user game.

Meanwhile, when a destination of the vehicle 1000 is required to be changed or a route of the vehicle 1000 is required to be changed, the vehicle management game service providing device may provide, to the game providing server, data pertaining to necessity of changing the route, information about a plurality of routes, a required time for traveling along the plurality of routes, and an estimated time of arrival at a destination, or the like.

Upon receiving the data for changing a route, the game providing server may configure the intention recognition game having a function of allowing the user to select one route from among the plurality of routes, a function of differentially calculating scores in the game by reflecting advantageous conditions such as a price, travel distance, and the like, and a function of reflecting calculated scores in the user game.

Furthermore, when it is necessary to control windows of the vehicle 1000 due to a sudden change of weather or control seats of the vehicle 1000 due to addition of an occupant, the vehicle management game service providing device may provide, to the game providing server, data pertaining to necessity of interior control. Upon receiving the data pertaining to necessity of interior control, the game providing server may configure the intention recognition game having a function of reflecting, in the user game, a function of allowing the user to select one setting from among a plurality of interior settings.

The vehicle management game service providing device may display an icon indicating an actual situation during the execution of the intention recognition game.

The game providing server may create the user game or intention recognition game suitable for an estimated destination arrival time of an occupant to provide the user game or intention recognition game to the vehicle management game service providing device, and may adjust, when the estimated destination arrival time is changed due to necessity of vehicle management, a game execution time according to the changed time.

According to an embodiment of the present disclosure, an occupant of a vehicle may control the vehicle through game manipulation when an important situation change, for which vehicle management is required, of a travel environment occurs during execution of a game, and thus may effectively cope with the situation change without missing the timing for vehicle management.

According to an embodiment of the present disclosure, intention history data of an occupant about vehicle management is accumulated through an intention recognition game each time a situation for which vehicle management is required occurs, and vehicle management corresponding to an occupant's intention may be performed using the accumulated data.

The above-mentioned embodiments can be implemented as computer-readable codes in a program-recorded medium. The computer readable medium includes all types of recording devices in which data readable by a computer system readable can be stored. Examples of the computer readable medium include a hard disk drive (HDD), a solid state disk (SSD), a silicon disk drive (SDD), a read-only memory (ROM), a random-access memory (RAM), CD-ROM, a magnetic tape, a floppy disk, an optical data storage device, and the like, and it may also be implemented in the form of a carrier wave (for example, transmission over the Internet). In addition, the computer may include a processor or a controller. Therefore, the above description should not be construed as limiting and should be considered illustrative. The scope of the present disclosure should be determined by rational interpretation of the appended claims, and all changes within the scope of equivalents of the present disclosure are included in the scope of the present disclosure.

What is claimed is:

1. A vehicle management game service providing device installed in a vehicle, comprising:
    a receiver configured to communicate with a game providing server for providing information for a user game in response to a user game execution request;
    a controller configured to obtain vehicle information, and determine whether a user's intervention is required with regard to a vehicle-related task on the basis of the obtained vehicle information;
    a user interface configured to receive a user input signal, and provide a screen according to execution of the user game; and
    an operator configured to operate the vehicle according to a vehicle control signal,
    wherein the controller executes an intention recognition game when the user's intervention is required during the execution of the user game, and generates the vehicle control signal on the basis of information generated according to execution of the intention recognition game in which the user input signal is reflected, and
    the intention recognition game is a game which determines a user's intention about the vehicle-related task.

2. The vehicle management game service providing device of claim 1, wherein the intention recognition game is a game which is executed in an independent area, which is switched from and independent of a user game execution area, within the user game execution area.

3. The vehicle management game service providing device of claim 1, further comprising:
    a storage,
    wherein the controller stores, in the storage, the user's intention determined on the basis of the user input signal input during the execution of the intention recognition game in association with the vehicle information achieved when the user input signal is input, and generates, when the obtained vehicle information matches the vehicle information stored in the storage, the vehicle control signal according to the user's intention matched to the stored vehicle information without executing the intention recognition game.

4. The vehicle management game service providing device of claim 3, wherein the controller generates initial learning data on the basis of a plurality of pieces of the vehicle information stored in the storage and user's intentions matched to the vehicle information, checks garbage data with regard to the generated initial learning data via the user interface, refines, on the basis of a result of the garbage data checking, the initial learning data to achieve final learning data in which the user's intentions are reflected without an error, generates a prediction model by performing machine learning on the basis of the refined final learning data, and generates the vehicle control signal according to the user's intention predicted by the prediction model without executing the intention recognition game since the prediction model is generated.

5. The vehicle management game service providing device of claim 1, wherein, based on determination that the user's intervention is required, the controller receives the intention recognition game from the game providing server via the receiver.

6. The vehicle management game service providing device of claim 1, wherein the vehicle information comprises a fuel state and a vehicle defect state, and the vehicle-related task comprises a change of a waypoint of the vehicle.

7. The vehicle management game service providing device of claim 6, wherein the vehicle information further comprises a driver preference and a scheduled travel route.

8. The vehicle management game service providing device of claim 7, wherein the receiver receives the vehicle information on the basis of a downlink grant of a 5G network connected for the vehicle to operate in an autonomous mode.

9. A vehicle management game service providing device communicating with a vehicle that operates according to a vehicle control signal, comprising:
    a receiver configured to communicate with a game providing server for providing information for a user game in response to a user game execution request;
    a controller configured to obtain vehicle information, and determine whether a user's intervention is required with regard to a vehicle-related task on the basis of the obtained vehicle information; and
    a user interface configured to receive a user input signal, and provide a screen according to execution of the user game,
    wherein the controller executes an intention recognition game when the user's intervention is required during the execution of the user game, and generates the vehicle control signal on the basis of information generated according to execution of the intention recognition game in which the user input signal is reflected, and
    the intention recognition game is a game which determines a user's intention about the vehicle-related task.

10. The vehicle management game service providing device of claim 9, wherein the intention recognition game is a game which is executed in an independent area, which is switched from and independent of a user game execution area, within the user game execution area.

11. The vehicle management game service providing device of claim 9, further comprising:
a storage,
wherein the controller stores, in the storage, the user's intention determined on the basis of the user input signal input during the execution of the intention recognition game in association with the vehicle information achieved when the user input signal is input, and generates, when the obtained vehicle information matches the vehicle information stored in the storage, the vehicle control signal according to the user's intention matched to the stored vehicle information without executing the intention recognition game.

12. The vehicle management game service providing device of claim 11, wherein the controller generates initial learning data on the basis of a plurality of pieces of the vehicle information stored in the storage and user's intentions matched to the vehicle information, checks garbage data with regard to the generated initial learning data via the user interface, refines, on the basis of a result of the garbage data checking, the initial learning data to achieve final learning data in which the user's intentions are reflected without an error, generates a prediction model by performing machine learning on the basis of the refined final learning data, and generates the vehicle control signal according to the user's intention predicted by the prediction model without executing the intention recognition game since the prediction model is generated.

13. The vehicle management game service providing device of claim 9, wherein, based on determination that the user's intervention is required, the controller receives the intention recognition game from the game providing server via the receiver.

14. The vehicle management game service providing device of claim 9, wherein the vehicle information comprises a fuel state and a vehicle defect state, and the vehicle-related task comprises a change of a waypoint of the vehicle.

15. The vehicle management game service providing device of claim 14, wherein the vehicle information further comprises a driver preference and a scheduled travel route.

16. A vehicle management game service providing method comprising:
communicating with a game providing server for providing information for a user game in response to a user game execution request;
obtaining vehicle information and determining whether a user's intervention is required with regard to a vehicle-related task on the basis of the obtained vehicle information;
receiving a user input signal and providing a screen according to execution of the user game;
executing an intention recognition game when the user's intervention is required during the execution of the user game, and generating a vehicle control signal on the basis of information generated according to execution of the intention recognition game in which the user input signal is reflected; and
operating a vehicle according to the vehicle control signal,
wherein the intention recognition game is a game which determines a user's intention about the vehicle-related task.

17. The vehicle management game service providing method of claim 16, wherein the intention recognition game is a game which is executed in an independent area, which is switched from and independent of a user game execution area, within the user game execution area.

18. The vehicle management game service providing method of claim 16, further comprising storing the user's intention determined on the basis of the user input signal input during the execution of the intention recognition game in association with the vehicle information achieved when the user input signal is input, and generating, when the obtained vehicle information matches the stored vehicle information, the vehicle control signal according to the user's intention matched to the stored vehicle information without executing the intention recognition game.

19. The vehicle management game service providing method of claim 18, comprising generating initial learning data on the basis of a plurality of pieces of the vehicle information and user's intentions matched to the vehicle information, checking garbage data with regard to the generated initial learning data, refining, on the basis of a result of the garbage data checking, the initial learning data to achieve final learning data in which the user's intentions are reflected without an error, generating a prediction model by performing machine learning on the basis of the refined final learning data, and generating the vehicle control signal according to the user's intention predicted by the prediction model without executing the intention recognition game since the prediction model is generated.

20. A computer-readable recording medium in which a vehicle management game service program is recorded, the vehicle management game service program causing a computer to perform:
communicating with a game providing server for providing information for a user game in response to a user game execution request;
obtaining vehicle information, and determine whether a user's intervention is required with regard to a vehicle-related task on the basis of the obtained vehicle information;
receiving a user input signal, and provide a screen according to execution of the user game;
operating the vehicle according to a vehicle control signal; and
executing an intention recognition game when the user's intervention is required during the execution of the user game, and generate the vehicle control signal on the basis of information generated according to execution of the intention recognition game in which the user input signal is reflected,
wherein the intention recognition game is a game which determines a user's intention about the vehicle-related task.

* * * * *